（12） United States Patent
Yoshida

(10) Patent No.: US 9,400,951 B2
(45) Date of Patent: Jul. 26, 2016

(54) DOT PATTERN

(71) Applicant: GRID IP PTE LTD, Singapore (SG)

(72) Inventor: Kenji Yoshida, Tokyo (JP)

(*) Notice: Subject to any disclaimer, the term of this patent is extended or adjusted under 35 U.S.C. 154(b) by 0 days.

(21) Appl. No.: 13/872,555

(22) Filed: Apr. 29, 2013

(65) Prior Publication Data

US 2013/0334322 A1 Dec. 19, 2013

Related U.S. Application Data

(62) Division of application No. 11/993,527, filed as application No. PCT/SG2006/000185 on Jun. 30, 2006, now Pat. No. 8,430,328.

(30) Foreign Application Priority Data

Jul. 1, 2005 (JP) ................................. 2005-194295

(51) Int. Cl.
*G06K 19/06* (2006.01)
*G06F 3/0354* (2013.01)

(52) U.S. Cl.
CPC ............ *G06K 19/06* (2013.01); *G06F 3/03545* (2013.01)

(58) Field of Classification Search
USPC ...................... 235/494, 454, 462.09; 382/151
See application file for complete search history.

(56) References Cited

U.S. PATENT DOCUMENTS

| 4,263,504 | A | 4/1981 | Thomas |
| 4,604,065 | A | 8/1986 | Frazer et al. |
| 4,627,819 | A | 12/1986 | Burrows |
| 5,051,736 | A | 9/1991 | Bennett et al. |
| 5,124,536 | A | 6/1992 | Priddy et al. |
| 5,128,528 | A | 7/1992 | Heninger |
| 5,329,107 | A | 7/1994 | Priddy et al. |
| 5,329,108 | A | 7/1994 | Lamoure |
| 5,416,312 | A | 5/1995 | Lamoure |
| 5,577,774 | A | 11/1996 | Morikawa et al. |

(Continued)

FOREIGN PATENT DOCUMENTS

| CA | 2 374 716 A1 | 11/2000 |
| CA | 2 374 808 A1 | 12/2000 |

(Continued)

OTHER PUBLICATIONS

U.S. Non-Final Office Action dated Feb. 14, 2012, issued in U.S. Appl. No. 11/993,527 (5 pages).

(Continued)

*Primary Examiner* — Ahshik Kim
(74) *Attorney, Agent, or Firm* — Westerman, Hattori, Daniels & Adrian, LLP

(57) ABSTRACT

To realize a dot pattern which can be read even by a frame buffer of which algorithm for search is simple and of which resolution is low without sacrificing an information dot for defining a direction of a block. There is provided a dot pattern, wherein a plurality of reference points is provided in an area of a block having a predetermined information dot arranged thereon; a plurality of virtual reference points to be defined is arranged from the reference points (for example, a central point of a grid area); an information dot is arranged, of which information is defined by a distance and a direction from the virtual reference point; and at least the information dot at the predetermined position is made into a direction dot showing the direction of the block by a direction from the virtual reference point.

37 Claims, 63 Drawing Sheets

(56) References Cited

U.S. PATENT DOCUMENTS

| | | |
|---|---|---|
| 5,591,957 A | 1/1997 | Morikawa et al. |
| 5,612,524 A | 3/1997 | Sant'Anselmo et al. |
| 5,661,506 A | 8/1997 | Lazzouni et al. |
| 5,852,434 A | 12/1998 | Sekendur |
| 5,860,679 A | 1/1999 | Fukuda et al. |
| 5,866,895 A | 2/1999 | Fukuda et al. |
| 5,874,718 A | 2/1999 | Matsui |
| 5,878,023 A | 3/1999 | Matsui |
| 5,892,846 A | 4/1999 | Davis |
| 5,896,403 A | 4/1999 | Nagasaki et al. |
| 5,920,661 A | 7/1999 | Mori et al. |
| 6,012,961 A | 1/2000 | Sharpe, III et al. |
| 6,043,899 A | 3/2000 | Morohashi et al. |
| 6,050,731 A | 4/2000 | Matsui |
| 6,052,813 A | 4/2000 | Nagasaki et al. |
| 6,058,498 A | 5/2000 | Nagasaki et al. |
| 6,072,917 A | 6/2000 | Mori et al. |
| 6,116,510 A | 9/2000 | Nishino |
| 6,119,937 A | 9/2000 | Wang et al. |
| 6,133,927 A | 10/2000 | Arai et al. |
| 6,186,405 B1 | 2/2001 | Yoshioka |
| 6,244,764 B1 | 6/2001 | Lei et al. |
| 6,360,948 B1 | 3/2002 | Yang et al. |
| 6,438,251 B1 | 8/2002 | Yamaguchi |
| 6,446,866 B1 | 9/2002 | Tatsuta |
| 6,460,155 B1 | 10/2002 | Nagasaki et al. |
| 6,502,756 B1 | 1/2003 | Fahraeus |
| 6,533,182 B1 * | 3/2003 | Ohshima et al. .............. 235/494 |
| 6,548,768 B1 | 4/2003 | Pettersson et al. |
| 6,561,423 B2 | 5/2003 | Yoshioka |
| 6,570,104 B1 | 5/2003 | Ericson et al. |
| 6,586,688 B2 | 7/2003 | Wiebe |
| 6,627,870 B1 | 9/2003 | Lapstun et al. |
| 6,633,008 B2 | 10/2003 | Johnson |
| 6,633,526 B1 | 10/2003 | Imade et al. |
| 6,663,008 B1 | 12/2003 | Pettersson et al. |
| 6,666,376 B1 | 12/2003 | Ericson |
| 6,674,427 B1 | 1/2004 | Pettersson et al. |
| 6,964,373 B2 | 11/2005 | Sasaki et al. |
| 7,328,845 B2 | 2/2008 | Tsai |
| 7,475,824 B2 | 1/2009 | Yoshida |
| 7,664,312 B2 * | 2/2010 | Yoshida ........................ 382/151 |
| 7,942,341 B2 * | 5/2011 | Ao et al. ........................ 235/494 |
| 7,967,217 B2 * | 6/2011 | Yoshida ........................ 235/494 |
| 8,031,375 B2 | 10/2011 | Yoshida |
| 8,237,983 B2 | 8/2012 | Yoshida |
| 8,253,982 B2 | 8/2012 | Yoshida |
| 8,430,328 B2 * | 4/2013 | Yoshida ........................ 235/494 |
| 8,553,284 B2 | 10/2013 | Yoshida |
| 2002/0030104 A1 | 3/2002 | Matsui et al. |
| 2002/0033820 A1 | 3/2002 | Wiebe |
| 2002/0044138 A1 | 4/2002 | Edso et al. |
| 2002/0159089 A1 | 10/2002 | Wiebe et al. |
| 2003/0012455 A1 | 1/2003 | Olsson et al. |
| 2005/0052682 A1 | 3/2005 | Ishikawa et al. |
| 2005/0173533 A1 | 8/2005 | Pettersson |
| 2005/0173544 A1 | 8/2005 | Yoshida |
| 2006/0154559 A1 | 7/2006 | Yoshida |
| 2007/0023523 A1 | 2/2007 | Onishi |
| 2007/0164110 A1 | 7/2007 | Yoshida |
| 2008/0149714 A1 | 6/2008 | Cheung et al. |
| 2008/0149722 A1 | 6/2008 | Cheung et al. |
| 2008/0252916 A1 | 10/2008 | Huang |
| 2012/0325910 A1 | 12/2012 | Yoshida |
| 2013/0050724 A1 | 2/2013 | Yoshida |
| 2013/0334322 A1 | 12/2013 | Yoshida |
| 2014/0029062 A1 | 1/2014 | Yoshida |

FOREIGN PATENT DOCUMENTS

| | | |
|---|---|---|
| CA | 2 519 271 A1 | 9/2004 |
| EP | 0 407 734 A1 | 1/1991 |
| EP | 0 670 555 A1 | 9/1995 |
| EP | 1 159 991 A2 | 12/2001 |
| EP | 1 229 471 A1 | 8/2002 |
| EP | 1 548 635 A1 | 6/2005 |
| EP | 1 605 395 A1 | 12/2005 |
| EP | 1 703 434 A1 | 9/2006 |
| EP | 1833001 A1 | 9/2007 |
| EP | 1876555 A1 | 1/2008 |
| GB | 2 349 836 A1 | 11/2000 |
| JP | 61-065213 A | 4/1986 |
| JP | 7-141104 A | 6/1995 |
| JP | 07-178257 A | 7/1995 |
| JP | 07-296387 A | 11/1995 |
| JP | 8-171620 A | 7/1996 |
| JP | 09-185488 A | 7/1997 |
| JP | 10-187907 A | 7/1998 |
| JP | 10-257309 A | 9/1998 |
| JP | 2000-285225 A | 10/2000 |
| JP | 2000-325668 A | 11/2000 |
| JP | 2001-318926 A | 11/2001 |
| JP | 2001-346032 A | 12/2001 |
| JP | 2002-002024 A | 1/2002 |
| JP | 2002-041199 A | 2/2002 |
| JP | 2002-149331 A | 5/2002 |
| JP | 2002-205291 A | 7/2002 |
| JP | 2003-511761 A | 3/2003 |
| JP | 2002-380503 | 4/2004 |
| JP | 2002-380932 | 4/2004 |
| JP | 2002-381743 | 4/2004 |
| JP | 2005-031932 A | 2/2005 |
| RU | 2126598 C1 | 2/1999 |
| RU | 2 166 207 C2 | 4/2001 |
| WO | 95/14346 A1 | 5/1995 |
| WO | 99/50787 A1 | 10/1999 |
| WO | 00/73981 A1 | 12/2000 |
| WO | 01/26032 A1 | 4/2001 |
| WO | 01/48591 A1 | 7/2001 |
| WO | 01/61455 A1 | 8/2001 |
| WO | 02/23464 A1 | 3/2002 |
| WO | 03/049023 A1 | 6/2003 |
| WO | 2004/029871 A1 | 4/2004 |
| WO | 2004/084125 A1 | 9/2004 |
| WO | 2005/064523 A1 | 7/2005 |
| WO | 00/72124 A1 | 11/2011 |

OTHER PUBLICATIONS

European Search Report dated Jun. 18, 2010, issued in European Patent Application No. 05737287.2 (6 pages).
International Search Report of PCT/JP2005/008210, date of mailing Aug. 16, 2005 (1 page).
European Search Report dated Feb. 17, 2006 issued in European Patent Application No. 03798532.2 (4 pages).
Russian Office Action dated Jan. 19, 2009, issued in Russian Patent Application No. 2007128915/09(031489). (now U.S. Pat. No. 8,237,983); (11 pages).
Russian Office Action dated Nov. 17, 2008 (mailing date), issued in Russian Patent Application No. 2007128915/09(031489). (now U.S. Pat. No. 8,237,983); (5 pages).
International Preliminary Report on Patentability dated Oct. 30, 2007, issued in PCT Application No. PCT/JP2005/008210 (Form PCT/IB/373 and Form PCT/ISA/237). (4 pages).
International Search Report of PCT/JP2004/019613, date of mailing Apr. 12, 2005 (2 pages).
International Preliminary Report dated Jul. 3, 2007, issued in PCT Application No. PCT/JP2004/019613 (Form PCT/IB/373 and Form PCT/ISA/237) (4 pages).
U.S. Notice of Allowance dated Apr. 4, 2012, issued in U.S. Appl. No. 11/794,174 (now U.S. Pat. No. 8,237,983) (14 pages).
U.S. Non-Final Office Action dated Jul. 12, 2011, issued in U.S. Appl. No. 11/794,174 (now U.S. Pat. No. 8,237,983) 13 pages).
Extended European Search Report dated Aug. 14, 2013, issued in European Patent Application No. 12173995.7 (10 pages).
European Opposition dated Aug. 13, 2013, issued in European Patent Application No. 05737287.2 (40 pages).
German Cancellation Action dated Apr. 30, 2012, issued in German Patent Application DE 202005022002.7, w/English-language explanation of relevance (27 pages).

(56) References Cited

OTHER PUBLICATIONS

U.S. Notice of Allowance dated Nov. 28, 2011, issued in U.S. Appl. No. 11/794,174 (now U.S. Pat. No. 8,237,983) (9 pages).
U.S. Non-Final Office Action dated Jan. 13, 2012, issued in U.S. Appl. No. 13/251,903 (10 pages).
U.S. Office Action dated Jul. 12, 2011, issued in U.S. Appl. No. 11/794,174 (13 pages).
European Search Report dated Apr. 25, 2006 issued in European Patent Application No. 03798532.2 (5 pages).
European Search Report dated Aug. 5, 2008 issued in European Patent Application No. 08008386.8 (8 pages).
U.S. Notice of Allowance dated Apr. 16, 2015, issued in U.S. Appl. No. 13/155,785 (9 pages).
U.S. Final Office Action dated Jul. 23, 2012, issued in U.S. Appl. No. 11/993,527 (11 pages).
U.S. Notice of Allowance dated Apr. 25, 2012, issued in U.S. Appl. No. 13/251,903 (now U.S. Pat. No. 8,253,982) (12 pages).
U.S. Non-Final Office Action dated Jun. 20, 2013, issued in U.S. Appl. No. 13/566,637 (36 pages).
Russian Office Action dated Apr. 28, 2005, Issued in corresponding Russian Patent Application No. 2007-144103 (8 pages).
European Office Action dated Jun. 18, 2010 issued in corresponding European Patent Application No. 05737287.2 (6 pages).
U.S. Notice of Allowance dated Jan. 3, 2013, issued in U.S. Appl. No. 11/993,527 (8 pages).
U.S. Final Office Action dated Jun. 24, 2010, issued in U.S. Appl. No. 10/529,440 (16 pages).
U.S. Non-Final Office Action dated Nov. 26, 2014, issued in U.S. Appl. No. 13/155,785 (10 pages).
U.S. Non-Final Office Action dated Nov. 12, 2009, issued in U.S. Appl. No. 10/529,440 (8 pages).
U.S. Non-Final Office Action dated May 5, 2014, issued in U.S. Appl. No. 13/155,785 (7 pages).
U.S. Office Action dated Mar. 6, 2014, issued in U.S. Appl. No. 13/566,637 (44 pages).
U.S. Notice of Allowance mailing date of Dec. 9, 2014, issued in U.S. Appl. No. 14/047,759 (12 pages).
U.S. Final Office Action dated Jan. 2, 2015, issued in U.S. Appl. No. 13/566,637 (52 pages).
U.S. Notice of Allowance mailing date of Mar. 30, 2015, issued in U.S. Appl. No. 14/047,759 (9 pages).
U.S. Notice of Allowance mailing date of Aug. 21, 2014, issued in U.S. Appl. No. 14/047,759 (7 pages).
Office Action dated Dec. 19, 2013, issued in U.S. Appl. No. 14/047,759 (14 pages).
Decision on Grant, issued in Russian Patent Application No. 2005112458/09 having an issue date of Aug. 26, 2008 (37 pages).
"Data Matrix" article in Wikipedia captured Nov. 24, 2014 at http://en.wikipedia.org/wiki/Data_Matrix (13 pages).
Text (without images) of Pettersson (WO 2003049023 A1) published Jun. 12, 2003 and retrieved at http://www.google.com/patents/WO2003049023A1 (9 pages).
International Search Report, mailing date of Oct. 19, 2006, issued in PCT/SG2006/000185 (3 pages).
Russian Office Action dated Feb. 19, 2008, issued in corresponding Russian Patent Application No. 2005112458/09 (26 pages).
European Search Report dated Aug. 5, 2008 issued in corresponding European Patent Application No. 08008386.8 (8 pages).
U.S. Notice of Allowance dated Feb. 23, 2011, issued in U.S. Appl. No. 10/529,440 (8 pages).
U.S. Non-Final Office Action dated Sep. 11, 2015, issued in U.S. Appl. No. 13/566,637 (55 pages).
U.S. Non-Final Office Action dated Aug. 10, 2015, issued in U.S. Appl. No. 14/546,705 (14 pages)).
U.S. Notice of Allowance dated Sep. 3, 2015, issued in U.S. Appl. No. 13/155,785 (24 pages).
U.S. Non-Final Office Action dated Aug. 14, 2015, issued in U.S. Appl. No. 14/047,759 (13 pages).
Taiwanese Office Action dated Jun. 26, 2015, issued in counterpart Taiwanese Patent Application No. 103119047 (with partial translation) (4 pages).
Communication of Notice of Opposition dated Jun. 24, 2015, issued in counterpart EP application No. 06748126.7, (78 pages).
U.S. Final Office Action dated Apr. 11, 2016, issued in U.S. Appl. No. 14/047,759 (12 pages).

* cited by examiner

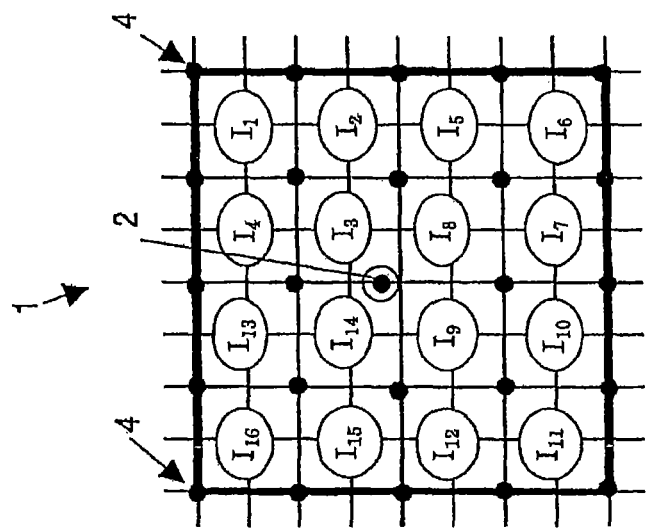
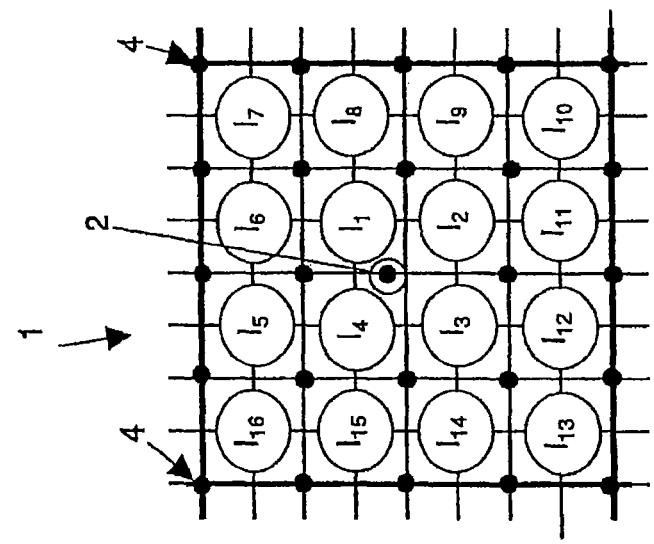
Fig. 3B
Fig. 3A

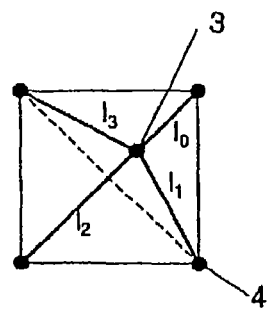
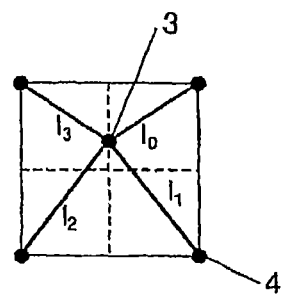
Fig. 47A          Fig. 47B
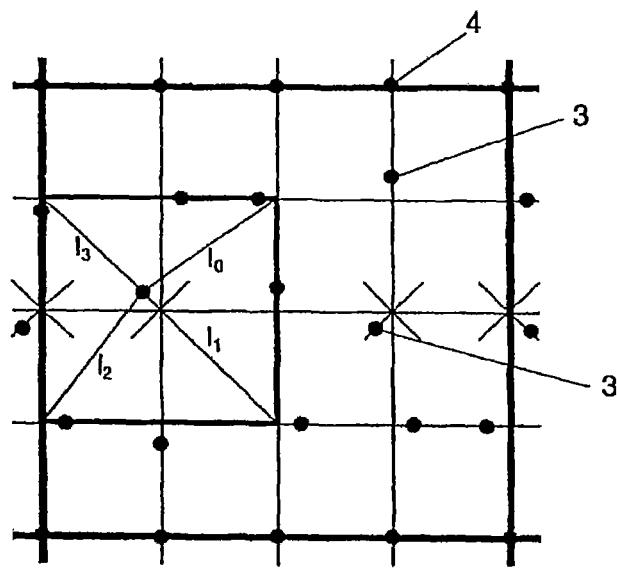
Fig. 47C

DOT PATTERN

BACKGROUND OF THE INVENTION

1. Field of the Invention

The present invention relates to an information input and output method using a dot pattern for inputting and outputting various information and programs by optically reading the dot pattern information formed on a printed material or the like, and particularly, the present invention relates to a technology whereby a direction of a block configured by a dot can be determined.

2. Description of the Related Art

Conventionally, an information output method for outputting the information such as voice by reading a bar code formed on a printed material or the like has been suggested. For example, a method for storing the information equivalent to the given key information in a storing means in advance, retrieving this information from keys read by a bar code reader, and outputting it has been suggested. In addition, a technology to form a dot pattern that minute dots are arranged in a predetermined rule so that much information and many programs can be outputted, fetch the dot pattern printed on the printed material or the like by a camera as the image data, digitalize it, and output the voice information has been also suggested.

However, the conventional method for outputting the voice or the like by the bar code has a problem such that the bar code printed on the printed material or the like is obtrusive. In addition, the bar code is large and it occupies a part of a page space, so that this method has a problem such that it is not possible to allocate many bar codes in an easy understood manner to each of a part of writing or sentence, or a photograph, a picture, a character having a meaning in an image of a graphic, and an object from a point of view lay out.

Therefore, as shown in the following patent documents, the inventor (s) of the present invention has suggested fully new dot patterns capable of storing much data without influences on a print side.

[Patent Document 1] WO/2004/084125
[Patent Document 2] PCT/JP2004/019427

In these related arts by the inventor(s) (namely, patent documents 1 and 2), the inventor suggests that a key dot is provided and a direction of the data (a direction of a block) and an area of a block are defined. Since the direction of the block can be grasped in this manner, the information defined by the block can be given a different meaning for each direction. Therefore, it can be said that the inventor (s) of the present invention suggests an original dot pattern which can store various information.

However, according to the technology of defining the direction of the block by this key dot, the information dot cannot be arranged at a place where the key dot is arranged, so that the information amount of the block is limited and an algorithm for searching for the key dot gets complex to require a long calculation time, and the focused amount of the ambient area of the key dot is large. This leads to a problem to be solved such that a resolution of a frame buffer is also required, which is newly pointed out by the inventor (s) of the present invention.

BRIEF SUMMARY OF THE INVENTION

The present invention has been made taking the foregoing problems into consideration and an object of which is to realize a technology of using a direction dot in place of a key dot, which can be read even by a frame buffer of which algorithm for search is simple and of which resolution is low, without sacrificing an information dot for definition of a direction of a block.

In order to solve the above-described problem, the present invention employs the following means.

In other words, according to a first aspect of the present invention, there is provided a dot pattern, in which a plurality of reference points is provided in an area of a block having a predetermined information dot arranged thereon; a plurality of virtual reference points to be defined (for example, a central point of a grid area) is arranged from the reference point; an information dot is arranged, of which information is defined by a distance and a direction from the virtual reference point; and at least the information dot at the predetermined position is made into a direction dot showing the direction of the block by the direction from the virtual reference point.

In other words, according to the present invention, a reference point is arranged on the basis of a predetermined rule (for example, at predetermined intervals for each of apexes of a triangle, a square, further, other polygons and for each of sides thereof or the like) on the surface of medium such as paper. Then, on the basis of a predetermined rule from the arranged plural reference points, the virtual reference point is set. In this case, a predetermined rule is that an intersecting point connecting the apexes of the polygons each other is defined as a virtual reference point. Further, a dot is arranged at an end point of a vector with this virtual reference point defined as a start point. This dot functions as an information dot defining the information, however, by differentiating the direction of one information dot at least in the block from other information dots, it is possible to make this information dot into a direction dot indicating the direction and the size of this block. Here, in the case that this direction dot is arranged at the vector end point in the upper direction from the virtual reference point, it can be discriminated that the block to which this direction dot belongs is directed upward.

In addition, in the case that a plurality of blocks is connected, the size of the block can be identified by a repeat pattern of the arrangement position of the direction dot. For example, when the direction dot is arranged at the center of the block, if this direction dot appears in upper, lower, right, and left directions for every three areas, it can be identified that this block has the size of threexthree grid area.

Thus, by using the information dot also as the direction dot indicating the direction of the block, the direction of the block can be defined while giving the meaning of the information to this direction dot itself. This makes it possible to define the direction of the block without sacrificing the information dot.

In addition, arranging such a direction dot in a block in such a manner that no same positional relation reappears when a rectangular area where such a direction dot within the block is rotated 90 degrees by 90 degrees centering on any reference point, in other words, when the rectangular area is rotated by 90 degrees, 180 degrees, and 270 degrees, the direction dot can be read even by a frame buffer of which algorithm for search is simple and of which resolution is low.

Further, such a dot pattern can be generated on a surface of the medium such as paper by programming this dot pattern in an information processor such as a computer and printing and outputting it by a printer or the like on the basis of this program.

In addition, by reading such a dot pattern on the surface of the medium as the image data using an optical reading means and analyzing the image data to analyze a position and a distance between the mutual dots, it is possible to identify this dot pattern as a reference point, a virtual reference point, a direction dot, and an information dot.

According to the second aspect of the present invention, there is provided a dot pattern of the first aspect of the invention, wherein the reference points are grid points which are arranged at even intervals in the upper and lower directions or the right and left directions in the block area; and using a center of the four grid points as the virtual vector start point and with reference to this virtual vector start point, the information is defined in the information dot by a direction eliminating the direction necessary for defining the direction dot.

The direction dot is also used as the information dot, however, the direction to define the information and the direction to define the direction of the block may be confused. Therefore, at the position where the direction dot in the block is arranged, the information dot may define both of the information and the direction of the block by a distance from a virtual vector start point which is a center of four grid points to horizontal and vertical directions and the information dot in other blocks may define the information by a distance from the virtual vector start point in an oblique direction.

According to a third aspect of the present invention, there is provided a dot pattern of the first aspect of the invention, wherein providing reference grid lines in a longitudinal direction and a lateral direction in the area of the block, the reference point uses virtual grid points which are provided on the reference grid line in the longitudinal direction or in the lateral direction at certain intervals as the virtual vector start point; and with reference to this virtual vector start point, the meaning of the information is given depending on whether or not the information dot is arranged.

Thus, even in a dot pattern that the meaning of the information is given depending on with or without of the information dot, it is possible to arrange a direction dot which is also used as the information dot.

Here, in addition to the virtual grid point provided on the reference grid line in the horizontal or the vertical direction, setting a grid line in an oblique direction, an intersecting point thereof may be defined as a virtual grid point.

According to a fourth aspect of the present invention, there is provided a dot pattern of the third aspect of the present invention, in which the information dot at a predetermined position in the block is defined as a direction dot; and the information dot to be arranged at a position where the rectangular area to which this direction dot belongs is rotated 90 degrees by 90 degrees around the center of the block, namely, the information dot to be located at each rectangular area located 90 degrees, 180 degrees, and 270 degrees from the block center, respectively, may define the information by a direction or by a distance eliminating a direction necessary for defining the direction dot.

Thus, by arranging the direction dot in such a manner that no same positional relation reappears when a rectangular area which is used as a direction dot within the block is rotated 90 degrees by 90 degrees, the direction dot can be read even by a frame buffer of which algorithm for search is simple and of which resolution is low.

According to a fifth aspect of the present invention, there is provided a dot pattern of the first aspect of the invention, wherein providing reference grid lines in a longitudinal direction and a lateral direction in the area of the block, providing virtual grid points at certain intervals on the reference grid line, and arranging a reference grid point dot on the virtual grid point which is provided on the reference grid line in the lateral direction, the reference point uses a line connecting the reference gird point dots and a line connecting the virtual grid points in the longitudinal direction as a grid line and uses the intersecting point of the grid lines as a virtual vector start point; and with reference to this virtual vector start point, the information is defined in the information dot by a direction eliminating the direction necessary for defining the direction dot.

Thus, also in a dot pattern such that the reference grid point dot is arranged on the virtual grid point formed on the reference grid line in a horizontal direction, lines connecting the reference grid point dots mutually and connecting the virtual grid points in the vertical direction mutually are defined as a grid line, and an intersecting point of the grid lines is defined as a virtual vector start point, it is possible to arrange the direction dot which is also used as the information dot.

In such a dot pattern, since the reference grid line in the horizontal direction is a criterion for arrangement of the reference grid point dot, if the direction dot is arranged in any direction among upper and lower directions from the virtual vector start point, the direction of the dot pattern of the direction dot can be known. Accordingly, the information dot may define the information by a direction eliminating a direction necessary for defining the direction dot (the upper and lower directions), for example, in an oblique direction.

According to a sixth aspect of the present invention, there is provided a dot pattern of the fifth aspect of the present invention, wherein the information dot at a predetermined position in the block is defined as a direction dot; in an information dot other than the direction dot located on the grid line in the lateral direction on which the direction dot is arranged, and an information dot which is located at a symmetric position with the direction dot having a grid line in a lateral center direction of the block as a symmetric axis, the information is defined by a direction or by a distance eliminating the necessary direction for defining the direction dot.

In a special exception of this, when the direction dot is arranged at a center of the block, it is necessary that the information dot on the grid line which becomes a central line is arranged eliminating a direction necessary for defining the direction in the direction dot, however, on the other grid line, the information dot can be arranged in any of horizontal and vertical directions and the length of the information dot can be freely defined.

According to the seventh aspect of the present invention, there is provided a dot pattern, in which a plurality of reference points is provided in an area of a block where predetermined information dot is arranged; a plurality of virtual reference points to be defined is arranged from the reference points; the information dots of which information are defined by a distance and a direction from the virtual reference points are arranged; and the direction of the block is defined in such a manner that at least one or more if dots at predetermined positions are differentiated from the other information dots in the direction from the virtual reference point.

Thus, by differentiating how to arrange the information dot (namely, the direction from the virtual reference point) from the other information dot, it is possible to give the other meaning to the information dot, namely, the information dot can be used for defining the direction of the block. Therefore, this makes it possible to define the direction of the block without sacrificing the arrangement place of the information dot as compared to the key dot.

According to a eighth aspect of the present invention, there is provided a dot pattern of the seventh aspect of the invention, wherein the direction of the block is defined by the arrangement of the reference point or the virtual reference point.

As stated above, according to a ninth aspect of the present invention, there is provided a dot pattern of the seventh aspect of the invention, wherein the direction of the block is defined by differentiating directional standards of at least one or more information dots at predetermined positions from those of the other information dots.

As stated above, according to a tenth aspect of the present invention, there is provided a dot pattern of the seventh aspect of the invention, wherein, in the information dots at predetermined positions having the different directional standards being from those of the other information dots, the direction of the block is defined by the direction from the virtual reference point.

As stated above, according to a eleventh aspect of the present invention, there is provided a dot pattern of the seventh aspect of the invention, wherein the reference point coincides with the virtual reference point.

As stated above, according to a twelfth aspect of the present invention, there is provided a dot pattern of the seventh aspect of the invention, wherein the predetermined position is 3 or more; and the direction of the block is defined by the shape connecting respective positions by a line.

In this way, by setting three or more information dots that are arranged differently, it is possible to define the direction of the block in a shape connecting the arrangement positions by lines. Here, for example, the shape is a triangle and an arrow or the like, and it is preferable that the direction is identified by these forms.

According to a thirteenth aspect of the present invention, there is provided a dot pattern of the seventh aspect of the invention, wherein the predetermined position is 1; and the direction of the block is defined by the arrangement position in the block.

Thus, by making the information dot differently arranged at only one place in the block, the direction of the block can be defined depending on the arrangement position in this block.

According to the present invention, it is possible to realize a dot pattern which can easily define the direction of the block.

BRIEF DESCRIPTION OF THE SEVERAL VIEWS OF THE DRAWINGS

FIGS. 3A and 3B are explanatory views for illustrating a key dot in GRID1 and shows an example of the arrangement of the information dot;

FIGS. 6A, 6B, 6C, and 6D illustrate a 2×3, 3×3, 3×4, and 6×6 dot patterns in GRID1, respectively;

FIGS. 35A and 34B are explanatory views (2) changing how to arrange the information dot and defining a direction of a block in GRID1;

FIG. 4G is an explanatory view (3) changing how to arrange the information dot and defining a direction of a block in GRID4;

FIGS. 47A, 47B, and 47C are explanatory views illustrating a determination algorithm of a direction dot and an information dot according to the present embodiment;

DETAILED DESCRIPTION OF THE INVENTION

Next, the present invention will be described with reference to the drawings.

At first, basic principles of dot patterns used for the present invention will be explained, and then, the embodiments of direction dots of these dot patterns will be explained below.

(Explanation of the Dot Pattern: GRID1)

FIGS. 1 to 20 are explanatory views for illustrating a principle of a dot pattern which is a premise of the present invention. These FIGS. 1 to 20 illustrate a dot pattern in GRID1 and include a key dot 2.

However, this key dot 2 is different from the direction dot of the present invention and is not a characteristic of the present invention. The difference between the key dot 2 shown in these FIGS. 1 to 20 and the direction dot of the present invention will be described in detail on and after FIG. 21.

Figure 1:
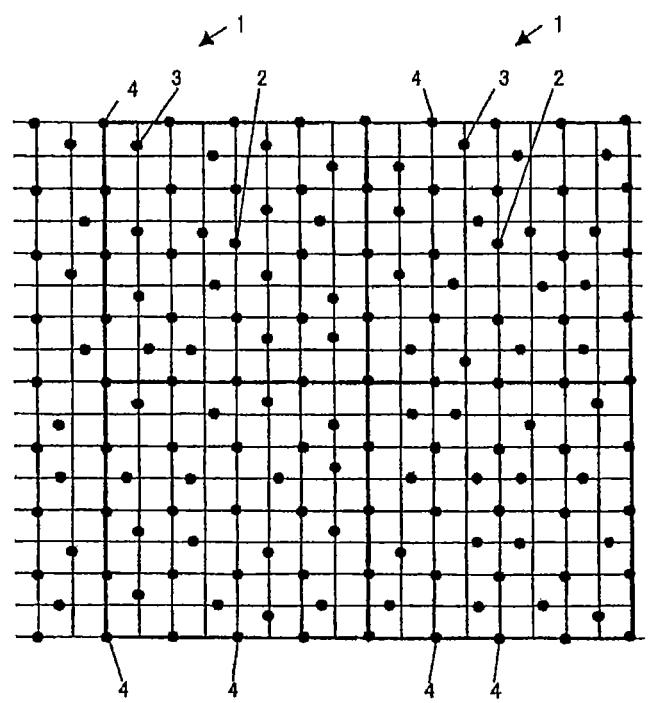
FIG. 1 is a principle view (1) of a dot pattern in GRID1.
Figure 2:
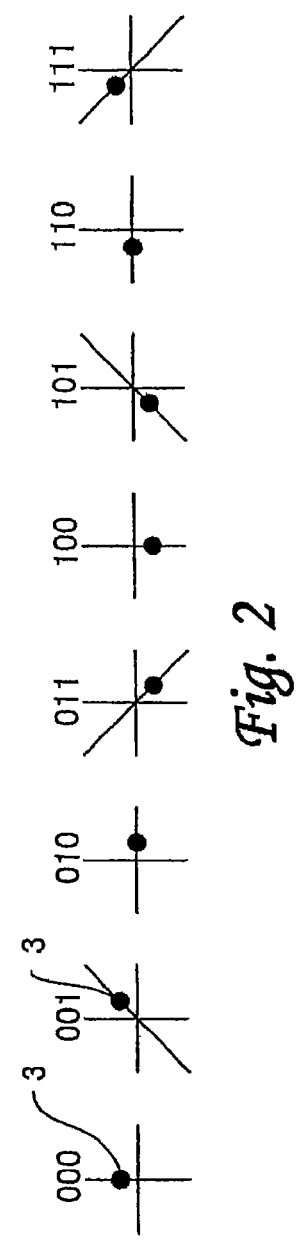
FIG. 2 shows examples of an information dot of the dot pattern and a bit display of the data defined there.

FIG. 1 is an explanatory view showing GRID1 which is an example of the dot pattern according to the present invention. FIG. 2 is an enlarged view showing examples of the information dot of the dot pattern and the bit display of the data defined there. FIGS. 3A and 3B are explanatory views showing information dots arranged centering on a key dot (this key dot is different from the direction dot of the present invention).

An information input and output method using the dot pattern according to the present invention may include generation of a dot pattern 1, a means of recognizing the dot pattern 1 and a means of outputting the information and a program from this dot pattern 1. In other words, by fetching the dot pattern 1 by a camera as the image data, extracting a reference grid point dot 4, then, extracting a key dot 2 (this key dot 2 is different from the direction dot of the present invention) when the dot is not hit at a proper position of the reference grid point dot 4, then, extracting an information dot 3 to digitalize the image data, and extracting an information area to quantify the information, the information and the program are outputted from this dot pattern 1 due to this numeric value information. For example, the information such as voice and the program are outputted to an information output apparatus, a personal computer, a PDA or a cellular telephone or the like from this dot pattern 1.

In the generation of the dot pattern 1 according to the present invention, minute dots for recognizing the information such as voice by a dot code generation algorithm, namely, a key dot, an information dot, and a reference grid point dot 4 are arranged in accordance with a predetermined rule. As shown in FIG. 1, in the block of the dot pattern 1 showing the information, the reference grid point dots 4 (5×5) are arranged centering on the key dot 2 and the information dots 3 are arranged around a central virtual grid point 5 which is encircled by four reference grid point dots 4. In this block, arbitrary numeric value information is defined. The example shown in FIG. 1 illustrates the state that four blocks of the dot pattern 1 (within a bold line) are arranged in parallel. However, it is obvious that the dot pattern 1 is not limited to four blocks.

It is possible to output one corresponding information and one corresponding program to one block or it is possible to output one corresponding information and one corresponding program to a plurality of blocks.

Upon fetch of this dot pattern 1 by the camera as the image data, the reference grid point dot 4 can correct distortion of a lens of a camera, cross shot, expansion and contraction of a page space, curve of a surface of a medium, and distortion of printing. Specifically, obtaining a function for correction, namely, (Xn, Yn)=f (Xn', Yn') to transform four distorted reference grid point dots 4 into the original square and correcting the information dot 3 by the same function, the vector of the correct information dot 3 is obtained.

If the reference grid point dot 4 is arranged in the dot pattern 1, the image data made by fetching this dot pattern 1 by the camera can be accurately recognized even when the widespread camera having a lens with a high distortion ratio fetches the image data of the dot pattern 1 since the reference grid point dot 4 corrects the distortion caused by the camera. In addition, even if the inclined camera reads the face of the dot pattern 1, this camera can accurately recognize the dot pattern 1.

As shown in FIG. 1, the key dot 2 is a dot arranged with one reference grid point dot 4 located at a substantially center of the reference grid point dots 4 arranged in a rectangular deviated in a predetermined direction. This key dot 2 is a representative point of the dot pattern 1 for one block representing the information dot 3. For example, the key dot 2 is the reference grid point dot 4 at the center of the block of the dot pattern 1 that is deviated upward 0.2 mm by 0.2 mm. In the case that the information dot 3 represents X and Y coordinate values, the position that the key dot 2 is deviated downward 0.2 mm by 0.2 mm becomes a coordinate point. However, this numeric value is not limited to this and it can be changed in accordance with the size of the block of the dot pattern 1.

The information dot 3 is a dot for recognizing various information. This information dot 3 is arranged around the key dot 2 which is a representative point, and making the center encircled by four reference grid point dots 4 into the virtual grid point 5, this information dot 3 is arranged at the endpoint represented by the vector using the virtual grid point 5 as a start point. For example, this information dot 3 is encircled by the four reference grid point dots 4. As shown in FIG. 2, the dot separated from that virtual grid point 5 by 0.2 mm has a direction and a length represented by the vector, so that these dots are arranged in eight directions rotated clockwise 45 degrees by 45 degrees to represent three bits. Accordingly, it is possible to represent 48 bits (3 bits×16) by the dot pattern 1 of one block.

In the example shown in the drawing, the dots are arranged in eight directions to represent three bits, however, it is possible to represent four bits by arranging the dots in sixteen directions not being limited to this and it is obvious that various modifications can be available.

It is preferable that a diameter of the key dot 2, the information dot 3 or the reference grid point dot 4 is about 0.1 mm in consideration of a visual quality, the accuracy of print with respect to a paper quality, a resolution of a camera, and the optimum digitalization.

In addition, in consideration of the necessary information amount with respect to the image pickup area and misrecognition of various dots 2, 3, and 4, it is preferable that the interval between the reference grid point dots 4 is about 1 mm by 1 mm. In consideration of misrecognition of the reference grid point dot 4 and the information dot 3, it is preferable that the deviation of the key dot 2 is about 20% of the grid interval.

It is preferable that the interval between this information dot 3 and the virtual grid point encircled by four reference grid point dots 4 is about 15 to 30% of the distance between the adjacent virtual grid points 5 because if the distance between the information dot 3 and the virtual grid point 5 is shorter than this interval, the dots are easily seen as a large block and the dots are hardly seen as the dot pattern 1. On the contrary, if the distance between the information dot 3 and the virtual grid point 5 is, longer than this interval, it is difficult to identify the dot as the information dot 3 having a vector directional character centering on any adjacent virtual grid point 5.

For example, as shown in FIG. 3A, in the information dot 3, the grid interval when I1 to I16 are arranged clockwise around the key dot 2 is 1 mm, and 3 bits×16=48 bits is represented by 4 mm×4 mm.

Further, it is possible to provide sub blocks which have independent information content in the block respectively and are not influenced by other information content. FIG. 3B shows these sub blocks and the sub blocks [I1, I2, I3, I4], [I5, I6, I7, I8], [I9, I10, I11, I12], and [I13, I14, I15, I16] composed of four information dots 3 have independent data (3 bits×4=12 bits) respectively developed in the information dot 3. Thus, by providing the sub blocks, it is possible to check an error easily in units of sub block.

It is preferable that the vector direction (the rotational direction) of the information dot 3 is evenly defined for each 30 degrees to 90 degrees.

Figure 4:
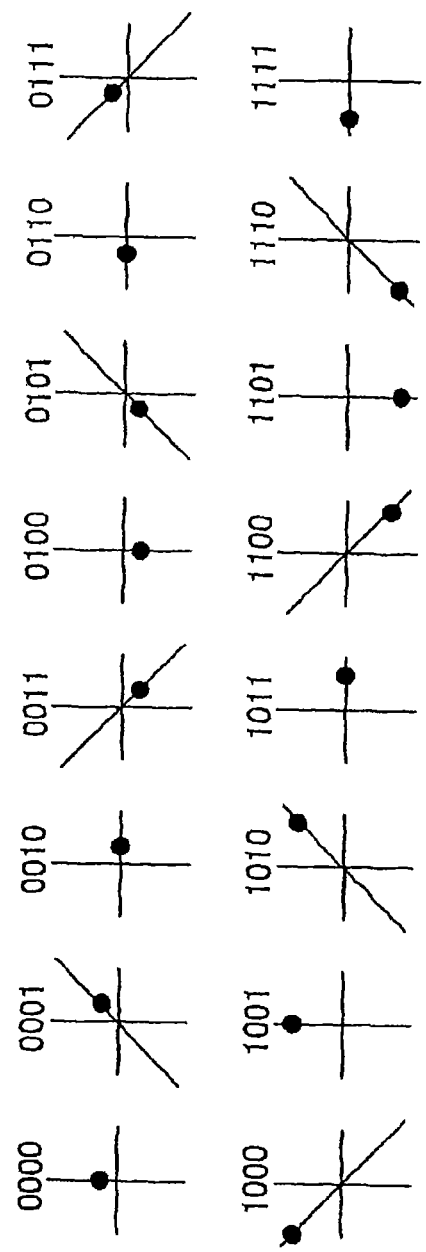
FIG. 4 is a view showing an arrangement example of the information dot in GRID1 and shows examples of the information dot of the dot pattern and the bit display of the data defined there.

FIG. 4 shows an example of the bit display of the information dot 3 and the data which is defined there and it shows other configuration.

In addition, using two kinds of long and short information dots 3 from among the virtual grid points 5 encircled by the reference grid point dot 4 and defining eight vector directions, it is possible to represent four bits. In this case, it is desirable that the distance between the virtual grid points 5 adjacent to longer one is about 25 to 30% and the distance between the virtual grid points 5 adjacent to shorter one is about 15 to 20%. However, the central interval between the long and short information dots 3 is preferably longer than the diameters of these dots.

It is preferable that the information dot 3 encircled by four reference grid point dots 4 is one dot in consideration of a visual quality. However, in the case of increasing the information amount ignoring the visual quality, the information dot 3 may have much information by allocating one bit to one vector and representing the information dot 3 by a plurality of dots. For example, in a concentric eight directional vectors, 28 pieces of information can be represented by the information dot 3 encircled by four reference grid dots 4 and 2128 is represented by 16 pieces of information dots of one block.

Figure 5A:
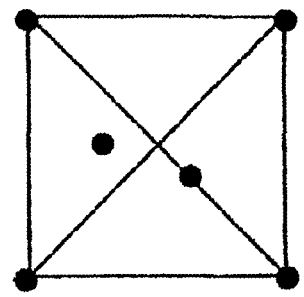
FIGS. 5A, 5B, and 5C show examples of the information dot in GRID1 and the bit display of the data defined there.
Figure 5B:
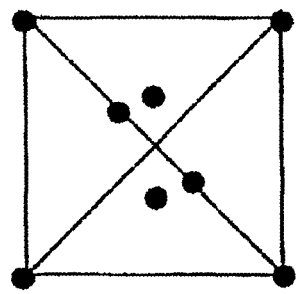
Figure 5C:
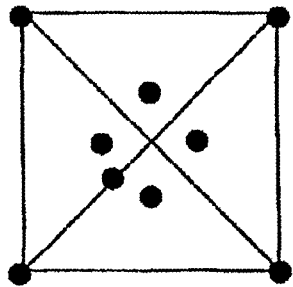

FIG. 5 shows an example of the bit display of the information dot and the data which is defined there. FIG. 5A shows the arrangement of two dots, FIG. 5B shows the arrangement of four dots, and FIG. 5C shows the arrangement of five dots.

Figures 6A, 6B, 6C, 6D:
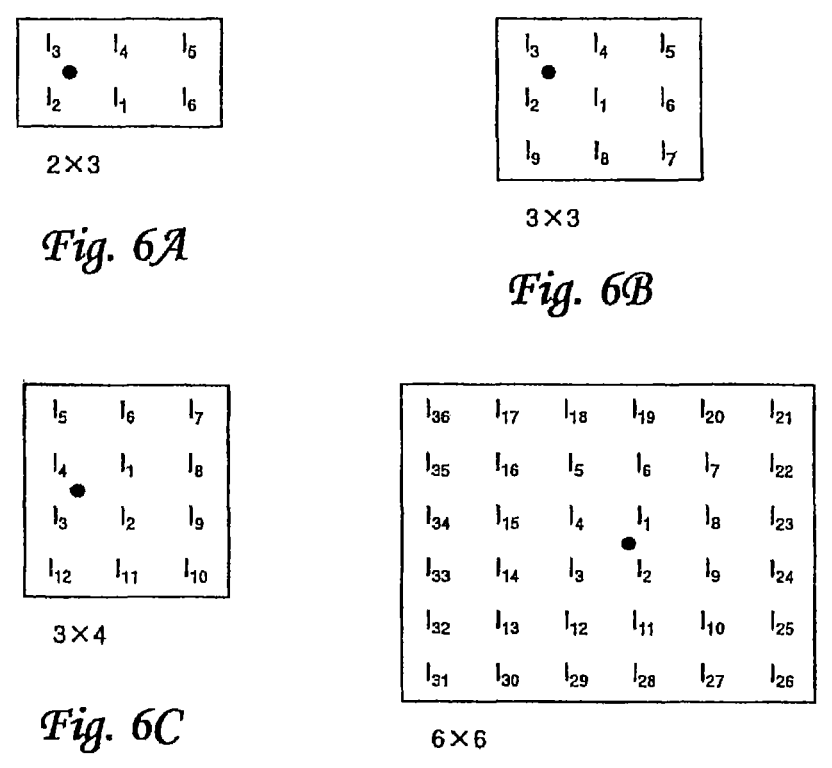

FIG. 6 shows a modified example of a dot pattern. FIG. 6A is a schematic view of the arrangement type of six information dots, FIG. 6B is a schematic view of the arrangement type of nine information dots, FIG. 6C is a schematic view of the arrangement type of twelve information dots, and FIG. 6D is a schematic view of the arrangement type of thirty-six information dots.

The dot pattern 1 shown in FIG. 1 and FIG. 3 show an example that 16 (4×4) information dots 3 are arranged in one block. However, this information dot 3 is not limited to the case that 16 pieces thereof are arranged in one block and various changes are possible. For example, in accordance with the volume of the necessary information amount or the resolution of the camera, as shown in FIG. 3A, 6 (2×3) information dots 3 are arranged in one block; as shown in FIG. 3B, 9 (3×3) information dots 3 are arranged in one block; as shown in FIG. 3C, 12 (3×4) information dots 3 are arranged in one block; or as shown in FIG. 3D, 36 information dots 3 are arranged in one block.

(Explanation of Dot Pattern: GRID3)

Next, GRID3 will be described.

Figure 7:
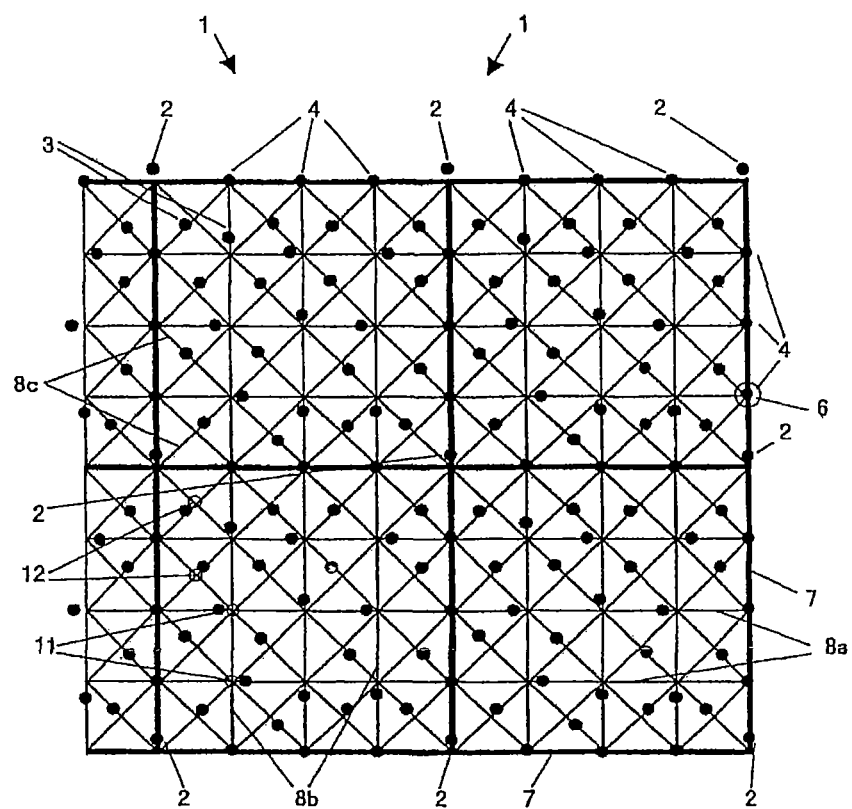
FIG. 7 is a principle view of a dot pattern in GRID3.
Figure 8:
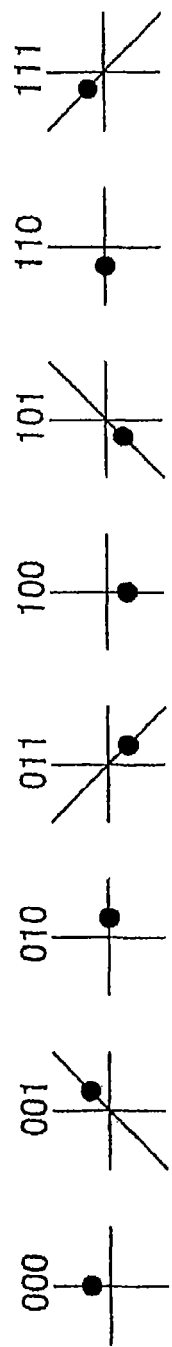
FIG. 8 is a view showing an arrangement example of an information dot in GRID3.
Figure 9C:
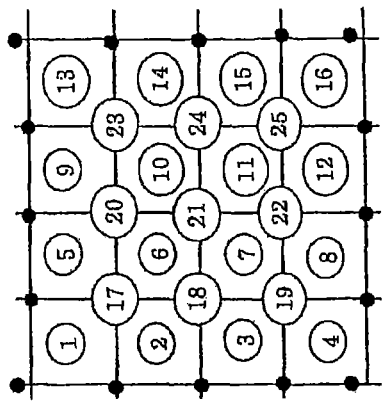
FIGS. 9A, 9B, and 9C are explanatory views for illustrating a key dot and the information dot in GRID3.
Figure 9B:
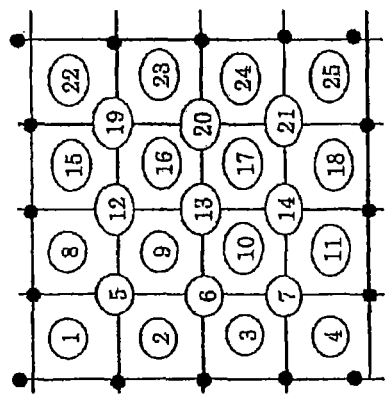
Figure 9A:
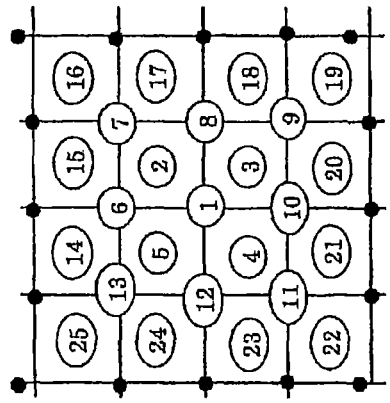

FIG. 7 is an explanatory view showing an example of a dot pattern according to the present invention; FIG. 8 is an enlarged view showing an example of the bit display of the information dot of the dot pattern and the data defined there; and FIGS. 9A, 9B, and 9C are explanatory views showing the arrangement of the key dot and the information dot.

The information input and output method using the dot pattern according to the present invention is formed by a means of recognizing the dot pattern 1 and a means of outputting the information and a program from this dot pattern 1.

In other words, by fetching the dot pattern 1 by a camera as the image data, extracting a reference grid point dot 4, then, determining that this as the position of a virtual reference grid point 6, a line connecting these virtual reference grid points 6 is defined as a reference grid line 7. Then, in the case that no dot is arranged at the position of the virtual reference grid point 6 where the reference grid point, dot 4 should be originally located on this reference grid line 7, extracting the dot around this virtual reference grid point 6, this dot is determined as the key dot 2 (the angle portion of the four corners of the block). Next, setting grid lines 8a and 8b in horizontal and vertical directions connecting the virtual reference grid points 6 each other, the intersect point of the grid lines is defined as a virtual grid point 11 (a first virtual grid point). Further, searching the dot around this virtual grid point 11, the information dot 3 to be defined by the distance and the direction from that virtual grid point 11 is extracted.

In addition, assuming that an oblique grid line 8c connecting the virtual reference grid points 6 each other in an oblique direction, the intersecting point of these oblique grid lines 8c is also defined as a virtual reference grid point 12 (a second virtual grid point). Then, also searching the dot around this virtual reference grid point 12, the information dot 3 to be defined by the distance and the direction from that virtual grid point 12 is extracted.

Next, the direction of the block is decided depending on the direction of the key dot 2 from the virtual reference grid point 6 or the virtual grid point 11. For example, when the key dot 2 is deviated from the virtual grid point into a +y direction, assuming a longitudinal direction as a normal state, the information dot 3 within the block may be recognized.

In addition, if the key dot 2 is deviated from the virtual reference grid point 6 or the virtual grid point 11 into a −y direction, assuming a direction rotating the block around the center of the block by 180 degrees as a normal state, the information dot 3 within the block may be recognized.

In addition, if the key dot 2 is deviated from the virtual reference grid point 6 or the virtual grid point 11 into a −x direction, assuming a direction rotating the block around the center of the block by 90 degrees clockwise as a normal state, the information dot 3 within the block may be recognized.

Further, if the key dot 2 is deviated from the virtual reference grid point 6 or the virtual grid point 11 into a +x direction, assuming a direction rotating the block around the center of the block by 90 degrees counterclockwise as a normal state, the information dot 3 within the block may be recognized.

If the images of the dot pattern 1 read by the optical reading means are accumulated in the frame buffer, central processing unit (CPU) of this optical reading means may analyze the dot of the frame buffer and may decode numeric values which are defined by the distances and the directions from the virtual grid point 11 and 12 of respective information dot 3 for each information dot 3. Then, these numeric values are outputted from the display means and the voice and image output means being checked against the information stored in the optical reading means or a memory of a personal computer as an xy coordinate or a code and with a voice, an image, a moving image, a character, and a program or the like corresponding to the xy coordinate or the code being read.

In the generation of the dot pattern 1 according to the present invention, minute dots for recognizing the information such as voice by a dot code generation algorithm, namely, the key dot 2, the information dot 3, and the reference grid 4 are arranged in accordance with the predetermined rule.

As shown in FIG. 7, a rectangular area shaped in a square or an oblong on the surface of the medium of the printed material or the like is defined as a block. Then, providing the virtual reference grid points 6 at certain intervals on the reference grid line 7 with the lines in the longitudinal direction and the lateral direction configuring the frame of the block defined as the reference grid line 7 (the line represented by a bold line in FIG. 1) the reference grid point dot 4 is arranged on the virtual reference grid points 6. Next, making lines connecting the virtual reference grid points 6 each other and being in parallel with the reference grid line 7 into grid lines 8a and 8b, the intersecting point of the grid lines 8a and 8b is defined as a virtual grid point 11 (a first virtual grid point).

Further, setting a grid line 8c connecting the virtual reference grid points 6 each other in the oblique direction, the intersecting point of these grid lines 8c is also defined as a virtual grid point 12 (a second virtual grid point).

By arranging one or plural information dots 3 having the distances and the directions based on the virtual grid points 11 and 12 which are set in this way, respectively, a dot pattern is generated.

Upon fetch of this dot pattern 1 by the camera as the image data, the reference grid point dot 4 can correct distortion of a lens of the camera, cross shot, expansion and contraction of a page space, curve of a surface of a medium, and distortion of printing. Specifically, obtaining a function for correction, namely, $(Xn, Yn)=f(Xn', Yn')$ to transform the distorted four virtual grid point into the original square and correcting the information dot 3 by the same function, the vector of the correct information dot 3 is obtained.

If the reference grid point dot 4 is arranged in the dot pattern 1, the image data made by fetching this dot pattern 1 by the camera can be accurately recognized even when the widespread camera having a lens with a high distortion ratio fetches the image data of the dot pattern 1 since the reference grid point dot 4 corrects the distortion caused by the camera. In addition, even if the inclined camera reads the face of the dot pattern 1, this camera can accurately recognize the dot pattern 1.

As shown in FIG. 7, the key dot 2 is a dot arranged by a distance and a direction with reference to one virtual grid point 11 located at a substantially center of the virtual grid point pints arranged in a rectangular. This key dot 2 is a representative point of the dot pattern 1 for one block representing one unit of the information dot groups. For example, the key dot 2 is deviated upward from the reference grid point dot 11 at the center of the block of the dot pattern 0.2 mm by 0.2 mm. Accordingly, in the case that the information dot 3 represents X and Y coordinate values from the virtual grid point, the position separated from the key dot 2 downward 0.2 mm becomes a virtual grid point (a coordinate point). However, this numeric value (0.2 mm) is not limited to this and it can be changed in accordance with the size of the block of the dot pattern 1.

The information dot 3 is a dot for recognizing various information. In FIG. 12, this information dot 3 is arranged around the key dot 2 which is a representative point, and making the center encircled by four virtual grid points 11 (the first virtual grid point) into the virtual grid point 12 (the second virtual grid point) this information dot 3 is arranged at the end point represented by the vector using the virtual grid point 12 as a start point. For example, this information dot 3 is encircled by the virtual grid points 11 and 12. As shown in FIG. 8, the dots separated from those virtual grid points 11 and 12 by 0.2 mm have a direction and a length represented by the vector, so that these dots are arranged in eight directions rotated clockwise 45 degrees by 45 degrees to represent three bits.

According to the drawing, it is possible to represent 48 bits (3 bits×16) by the dot pattern 1 of one block.

In the example shown in the drawing, the dots are arranged in eight directions to represent three bits, however, it is possible to represent four bits by arranging the dots in sixteen directions not being limited to this and it is obvious that various modifications can be available.

Further, in FIG. 7, in the all virtual grid points, the information dot is arranged at the end point position using this virtual grid point as the start point, however, being not limited to this, the information may be defined depending on whether or not the dot is arranged on the virtual grid point. For example, if the dot is arranged on the virtual grid point, the information can be defined as "1", and if the dot is not arranged on the virtual grid point, the information can be defined as "0".

It is preferable that a diameter of the information dot 3 or the reference grid point dot 4 is about 0.1 mm in consideration of a visual quality, the accuracy of print with respect to a paper quality, a resolution of a camera, and the optimum digitalization.

In addition, in consideration of the necessary information amount with respect to the image pickup area and misconceptions of various dots 2, 3, and 4, it is preferable that the interval between the reference grid point dots 4 is about 1 mm by 1 mm. In consideration of misconceptions of the reference grid point dot 4 and the information dot 3, it is preferable that the deviation of the key dot 2 is about 20% of the grid interval.

It is preferable that the interval between this information dot 3 and the virtual grid point 11 or 12 is about 15 to 30% of the distance between the adjacent virtual grid points 11 and 12 because if the distance between the information dot 3 and the virtual grid points 11 and 12 is shorter than this interval, the dots are easily seen as a large block and the dots are hardly seen as the dot pattern 1. On the contrary, if the distance between the information dot 3 and the virtual grid points 11 and 12 is longer than this interval, it is difficult to identify the dot as the information dot 3 having a vector directional character centering on any adjacent virtual grid points 11 and 12.

FIG. 9 shows the reading order of the information dot 3 within the block, and the encircled numbers in the drawing mean the areas where the information dots 3 are arranged every virtual grid point 11 and every virtual grid point 12, respectively.

For example, in FIG. 9A, (1) to (25) are arranged clockwise around (1) (this means an encircled number "1" in the drawing and the same applies on and after) which is the center of the block. In this case, for example, the grid interval is 1 mm and three bits×1,625=4,875 bits is represented by 4 mm×4 mm.

In FIG. 9B, after arranging the information dots (1) to (4) in the rectangular area in the upper left of the block by rotation in a longitudinal direction, the information dots (5) to (7) are arranged at the intersecting points of the horizontal and vertical grid lines.

In FIG. 9C, after arranging the information dots (1) to (16) in the rectangular area in the upper left of the block by rotation in a longitudinal direction, the information dots (17) to (25) are arranged at the intersecting points of the horizontal and vertical grid lines.

Figure 10:
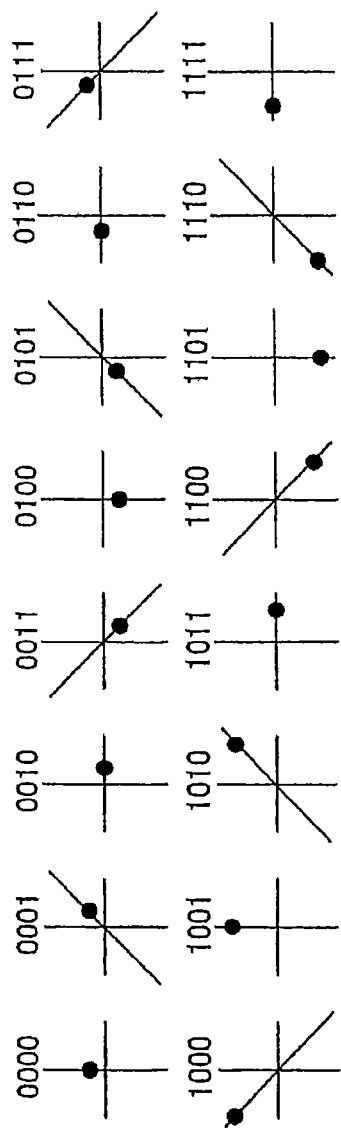
FIG. 10 shows examples of the information dot in GRID3 and the hit display of the data defined there.
Figure 11A:
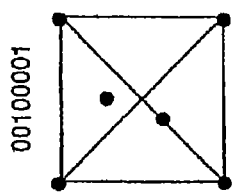
FIGS. 11A, 11B, 11C, 11D, 11E, and 11F show examples of an information dot 3 in GRID3 and the bit display of the data defined there.
Figure 11B:
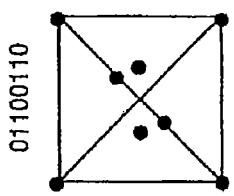
Figure 11C:
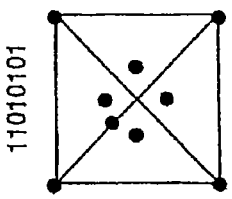
Figure 11D:
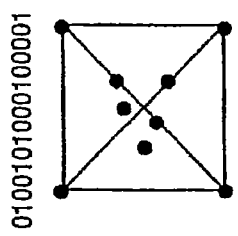
Figure 11E:
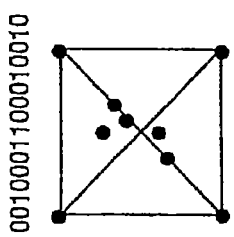
Figure 11F:
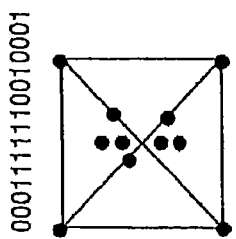

FIG. 10 shows an example of the bit display of the information dot and the data which is defined there and it shows other configuration.

In addition, using two kinds of short (the upper stage of FIG. 10) and long (the lower stage of FIG. 10) information dots 3 from among the virtual grid points 11, 12 encircled by the reference grid point dot 4 and defining eight vector directions, it is possible to represent four bits. In this case, it is desirable that the distance between the virtual grid points adjacent to longer one is about 25 to 30% and the distance between the virtual grid points adjacent to shorter one is about 15 to 20%. However, the central interval between the long and short information dots 3 is preferably longer than the diameters of these dots.

It is preferable that the information dot 3 encircled by four virtual grid points 11, 12 is one dot in consideration of a visual quality. However, in the case of increasing the information amount ignoring the visual quality, the information dot 3 may have much information by allocating one bit to one vector and representing the information dot 3 by a plurality of dots. For example, in a concentric eight directional vectors, 28 pieces of information can be represented by the information dot 3 encircled by four reference grid dots 4 and $2^{128}$ is represented by 16 pieces of information dots of one block.

FIG. 11 shows an example of the bit display of the information dot 3 and the data which is defined there. FIG. 11A shows the arrangement of two dots, FIG. 11B shows the arrangement of four dots, FIGS. 11C to 11E show the arrangement of five dots, and FIG. 11F shows the arrangement of seven dots.

FIG. 12 shows a modified example of a dot pattern. FIG. 12A is a schematic view of the arrangement type of eight information dots 3 in the block, FIG. 12B is a schematic view of the arrangement type of thirteen information dots 3 in the block, FIG. 12C is a schematic view of the arrangement type of eighteen information dots 3, and FIG. 12D is a schematic view of the arrangement type of forty-one information dots 3.

Figure 12A:
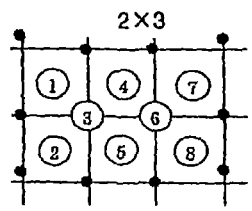
FIGS. 12A, 12B, 12C, and 12D are views showing modified examples of the dot pattern in GRID3.
Figure 12B:
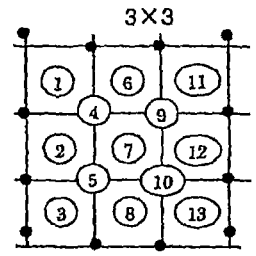
Figure 12C:
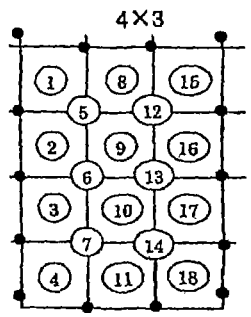
Figure 12D:
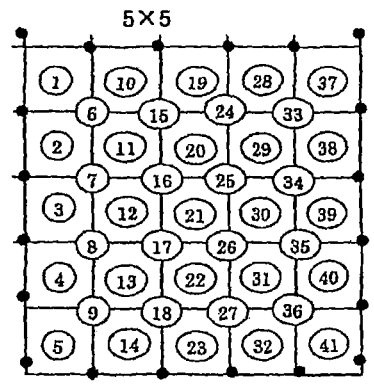

The above-described dot pattern 1 shown in FIG. 7 and FIG. 9 show an example that 25 pieces of information dots 3 are arranged in one block. However, this information dot 3 is not limited to the case that 25 pieces thereof are arranged in one block and various changes are possible. For example, in accordance with the volume of the necessary information amount or the resolution of the camera, as shown in FIG. 12A, 8 pieces of information dots 3 are arranged in one block; as shown in FIG. 12B, 13 pieces of information dots 3 are arranged in one block; as shown in FIG. 12C, 18 pieces of information dots 3 are arranged in one block; or as shown in FIG. 12D, 41 pieces of information dots 3 are arranged in one block.

(Explanation of Dot Pattern: GRID4)

Next, GRID4 will be described.

Figure 13A:
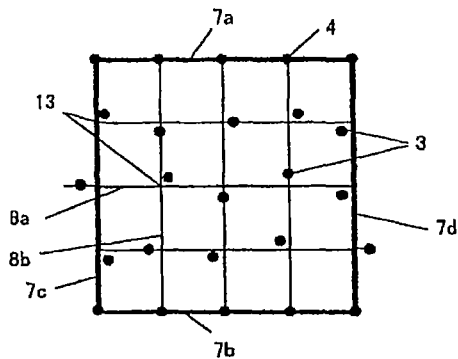
FIGS. 13A, 13B, and 13C are principle views dot pattern in GRID4.
Figure 13B:
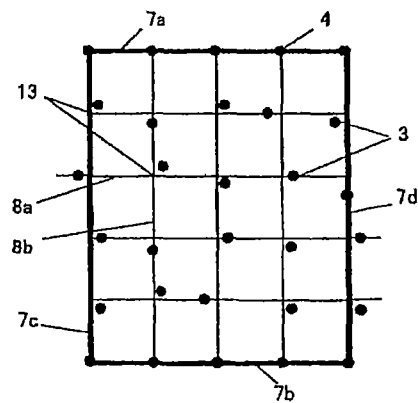
Figure 13C:
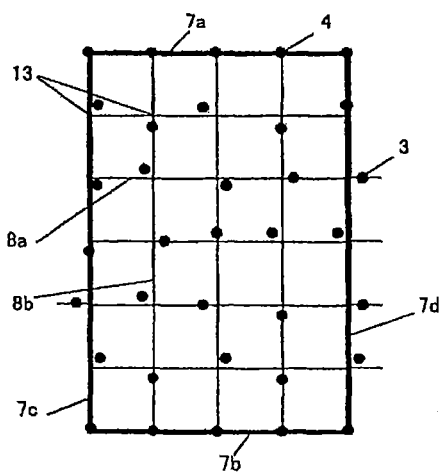

FIG. 13 specifically shows a dot pattern according to the embodiment of the present invention. FIG. 13A shows a dot pattern of 4×4 grids, FIG. 13B shows a dot pattern of 5×4 grids, and FIG. 13C shows a dot pattern of 6×4 grids.

In FIG. 13A, at first, providing reference grid lines 7a to 7d in a horizontal direction and a vertical direction composing a square, virtual grid points 13 are arranged at certain intervals within the square.

Further, the reference grid lines 7a to 7d and the virtual grid point 13 are not printed on a page space (a medium space) in practice but they are virtually set upon arrangement of the dot pattern on an image memory of a computer or upon reading of the dot pattern.

Next, the reference grid point dots 4 are arranged on the virtual grid points 14 on the upper and lower reference grid lines 7a and 7b in a lateral direction.

Next, assuming grid line 8a and 8b in horizontal and vertical directions connecting the virtual grid points 13 each other, the intersecting point of these grid lines 8a and 8b is defined as a virtual grid point 13 in the same way.

Next, by arranging one or two information dots 3 having the distance and the direction with reference to the virtual grid point 13 for each virtual grid point 13, a dot pattern is generated. Further, in FIG. 13, one information dot 3 is arranged for each virtual grid point 13.

FIG. 13A shows the case that the information dots 3 are arranged with four grids in a longitudinal direction and four grids in a lateral direction (4×4 grids); FIG. 13B shows the case of 5×4 grids; and FIG. 13C shows the case of 6×4 grids; respectively.

Figure 14:
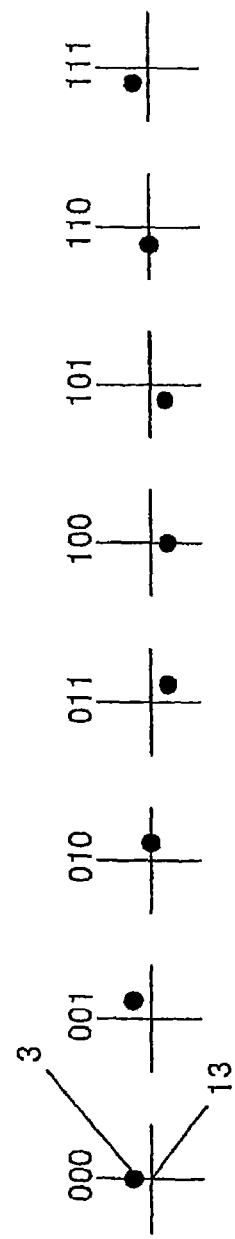
FIG. 14 is a view (1) showing a definition method of an information dot in GRID4.

FIG. 14 shows the definition of the information dot 3 and the value is defined in the direction of the information dot 3 around the virtual grid point 13. In this drawing, by arranging the information dots in eight directions rotated clockwise 45 degrees by 45 degrees with reference to the grid line passing through the virtual grid point, it is possible to define eight kinds of information in total (000 to 111 in a notation system of 2, three bits).

Figure 15:
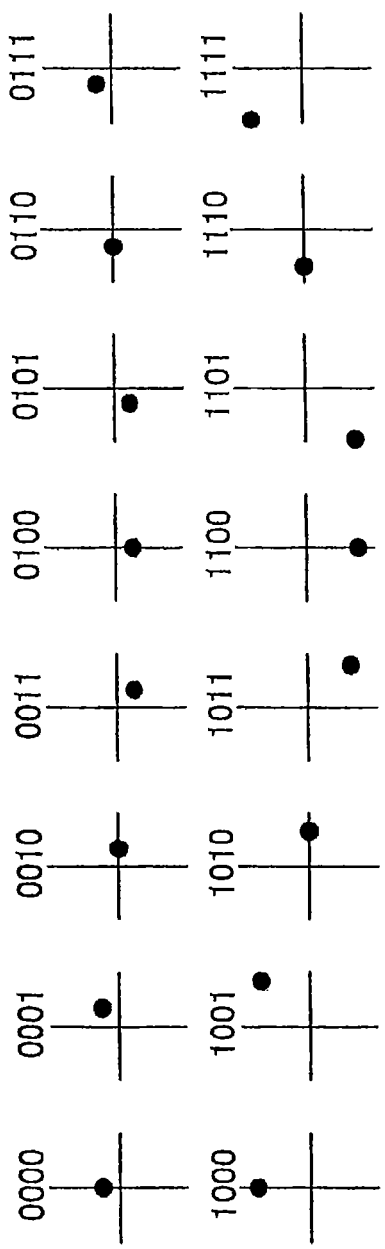
FIG. 15 is a view (2) showing a definition method of an information dot in GRID4.

In addition, in FIG. 15, by having the distance in two stages clockwise, it is possible to define sixteen kinds of information in total (in the notation system of 2), namely, the information of 0000 to 1111 (four bits).

Figure 16C:
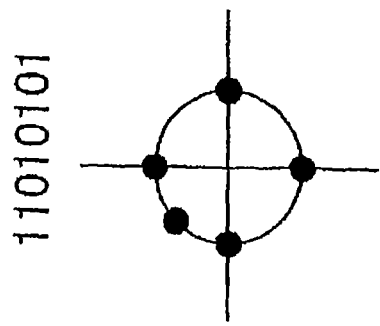
FIGS. 16A, 16B, and 16C are views (3) showing a definition method of an information dot in GRID4.
Figure 16B:
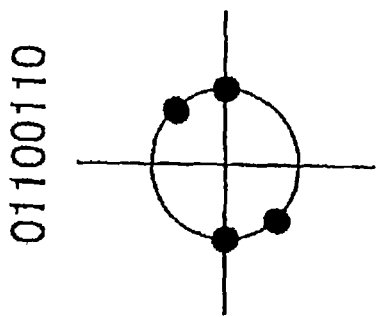
Figure 16A:
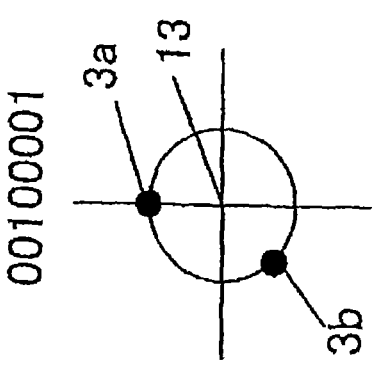

FIG. 16 shows the case that a plurality of information dots 3 is arranged on a concentric circle around the virtual grid point 13. By defining the position as "1" when there is a dot thereon and defining the position as "0" when there is no dot thereon, 8 bits can be defined. In other words, it is possible to define the hit information clockwise with the dot positioned in a vertical direction determined as the first bit.

Figure 17C:
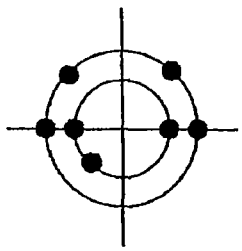
FIGS. 17A, 17B, and 17C are views (4) showing a definition method of an information dot in GRID4.
Figure 17B:
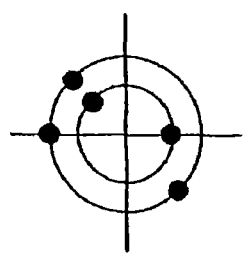
Figure 17A:
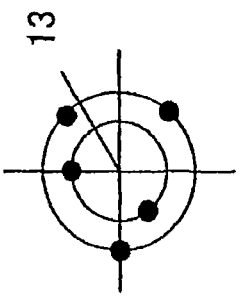

FIG. 17 shows the case that there are two concentric circles and 16 bits can be defined. Thus, it is possible to define the vast amounts of information with respect to one virtual grid point 13.

FIG. 18 is an explanatory view for illustrating a reading order of the information dot 3 by an optical reading means. In the drawing, the encircled numbers are used for a convenient purpose and the dot pattern is as illustrated in FIGS. 13A to 13C in practice.

Figure 18A:
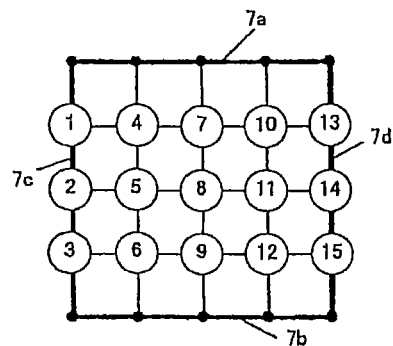
FIGS. 18A, 18B, and 18C are explanatory views for illustrating a reading order of the information dot by an optical reading means in GRID4.
Figure 18B:
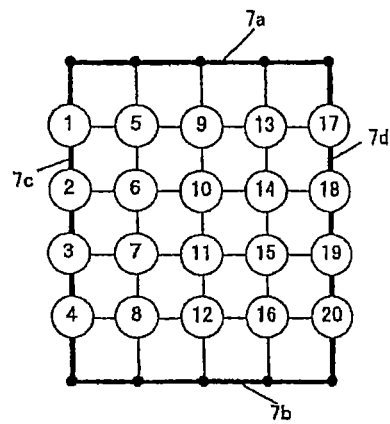
Figure 18C:
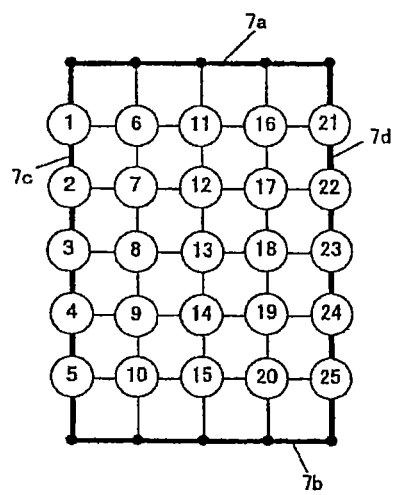

FIG. 18A, at first, reading the information dot for each virtual grid point along a reference grid line 7c at a left side in a longitudinal direction (the encircled numbers (1) to (3)), then, the virtual grid points 13 on a next grid line 8b in a longitudinal direction are read by rotation from the above (the encircled numbers (4) to (6)). Thus, reading for each virtual grid point 13 is carried out in series.

The reading for each grid is carried out by rotation from left of the grid line 8b in the longitudinal direction in the above explanation, however, it is obvious that the order of the grid for arranging and reading the information may be arbitrarily set.

Figure 19:
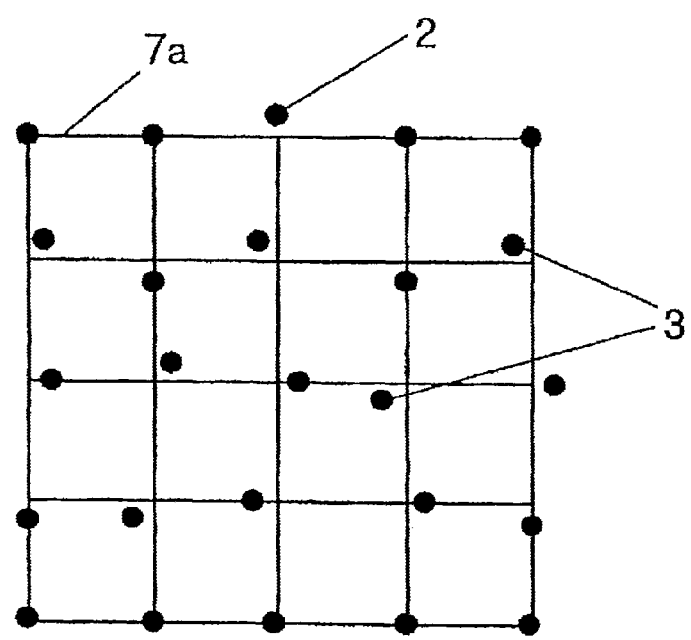
FIG. 19 is a view having a key dot arranged in place of a reference grid point dot in GRID4.

FIG. 19 shows an example that the key dot 2 is arranged on the virtual grid point 13 on the reference grid line in place of the reference grid point dot 4. The key dots 2 are arranged on the position deviated upward with reference to the virtual grid point 13 at the middle position of a reference grid line 7a.

By these key dots 2, the direction of the dot pattern can be defined.

Figure 20:
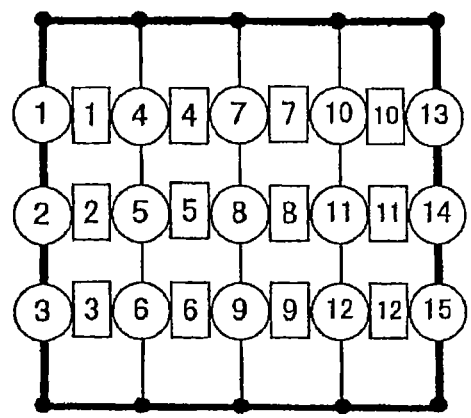
FIG. 20 is an explanatory view illustrating a reading method of an information dot by using a difference method in GRID4.

FIG. 20 is an explanatory view illustrating a reading method of the information dot 3 by using a difference method. Hereinafter, the number surrounded by a square in the drawing is represented by [ ] and the number encircled in the drawing is represented by ( ).

In other words, in FIG. 20, the value [1] is represented by a difference between the value of the information dot of (4) and the value of the information dot of (1) in 4×4 grids.

In the same way, [2] can be represented by the difference between (5) and (2), and [3] can be represented by the difference between (6) and (3). Further, [4] to [12] are represented in the same way.

It is possible to represent [1] to [12] by the difference between the following information dots.

[1]=(4)−(1)

[2]=(5)−(2)

[3]=(6)−(3)

[4]=(7)−(4)

[5]=(8)−(5)

[6]=(9)−(6)

[7]=(10)−(7)

[8]=(11)−(8)

[9]=(12)−(9)

[10]=(13)−(10)

[11]=(14)−(11)

[12]=(15)−(12)

By using such a difference method, plural different dot patterns can be generated with respect to one true value so as to improve a security.

(Explanation of a Direction Dot in GRID1)

The above-described FIGS. 1 to 20 mainly explain an example of a dot pattern proposed by the inventor (s) of the present invention. In the following explanation, the case of defining the direction of the block by the direction dot without using the key dot 2 will be described in detail.

Figure 21A:
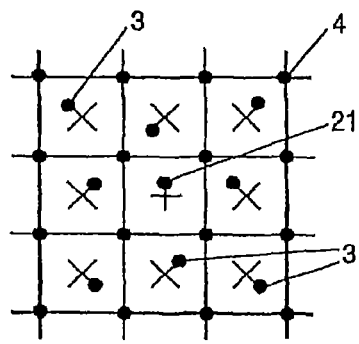
FIGS. 21A and 21B are views (1) having a direction dot arranged in GRID1.
Figure 21B:
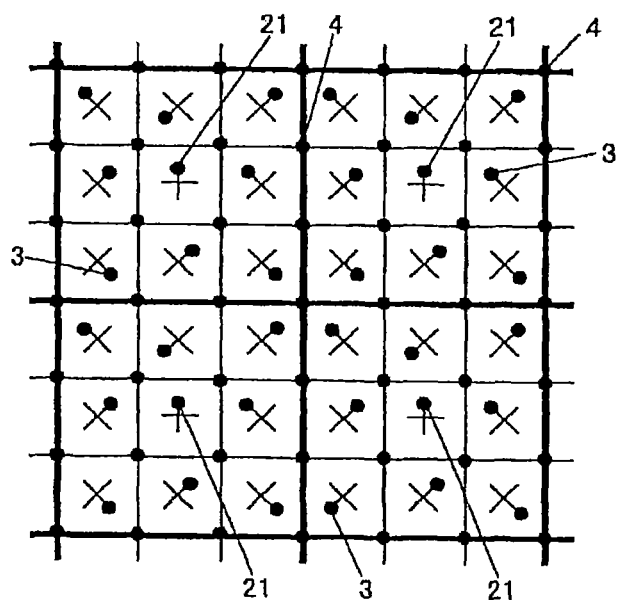

FIGS. 21A and 21B show the examples that a direction dot 21 is arranged on the premise of the dot pattern in GRID1 described in FIGS. 1 to 20.

In this example, the information is defined depending on how to deviate the area surrounded by the reference grid point dot 4 from the central point. Accordingly, the information dot 3 can be arranged on the all grid areas, however, the direction dot 21 is arranged only on 3×3 pieces of center grid areas.

On the area where the direction dot 21 is arranged, the direction dot represents the direction and the information being positioned deviated in the horizontal and vertical directions from the central point. In other words, in FIG. 21A, it is known that this block is upward because the direction dot 21 is arranged at the position deviated upward (a +Y direction) from the center. In the case that this direction dot 21 is arranged at the position deviated downward (a −Y direction) from the center, it is known that this block is downward. In the same way, when this direction dot 21 is arranged at the position deviated to the left (a −X direction) from the center, it is known that this block turns left, and when this direction dot 21 is arranged at the position deviated to the right (a +X direction) from the center, it is known that this block turns right.

In addition, in the grid area other than the direction dot 21, the information is defined by making the direction dot deviated into an oblique direction from the central point. This method of defining the information is described as above, so that the explanation thereof is herein omitted.

Further, such a grid area having a different directional standard from that of the other grid areas (the grid area where the direction dot 211 is arranged) defines the block in the direction of the direction dot 21 when the direction dot is arranged at its center, and when this grid area having the different directional standard is arranged in the other area of the block (the direction area), it is possible to define the direction of the block due to this arranged position (refer to FIG. 40). In addition, providing plural grid areas having the different directional standards, the direction of the block can be defined due to its arrangement mode (refer to FIGS. 34 to 37). In these cases, only by arranging the grid area having the different directional standards, the direction of the block can be defined, so that it is not always have to conform the information dot 3 arranged at this grid area to the direction of the block. This will be described in detail later.

Thus, by arranging the information dot 3 in the horizontal and vertical directions on the direction area and arranging the information dot 3 in the oblique direction on the other areas, an equal space property of the reference grid point is not sacrificed because none of the reference grid point dots 4 is deviated due to the key dot 2. Therefore, it is possible to simplify the reading algorithm for the dot pattern. In addition, the information dot 3 can be arranged as it is in the direction area, so that the direction of the block can be defined without sacrificing the information dot 3. Further, even when the direction dot 21 is arranged, the information can be defined by the amount of deviation from the central point (the length from the central point) and the information dot 3 can be used also as the direction dot 21.

FIG. 47 is an explanatory view illustrating a determination algorithm of a direction dot and an information dot.

Upon determination of the direction dot 21 and the information dot 3, the following procedure will be carried out.

(1) s=|I0−I2| is calculated.
(2) t=|I3−I1| is calculated.
(3) s−t is calculated.
(4) If s−t is not less than a predetermined value p, the dot is determined to be an information dot, and if s—t is less than the predetermined value p, the dot is determined to be a direction dot.

Specifically, in the case of FIG. 47A, when s−t=|I0−I2"−|I3−I1|=|I0−I2|, |I0−I2|≥p are established, the dot is the information dot.

In the case of FIG. 47B, when s−t=|I0−I2|−|I3−I1|=0, 0<p are established, the dot is the direction dot.

Further, the value of p can be arbitrarily set and it is preferably around 120 pixel 2, however, this value is not limited to this.

FIG. 21A shows a block formed by nine pieces of grid areas (3×3=9) and FIG. 21B shows an example that the blocks are arranged two-by-two in the horizontal and vertical directions.

Figure 22A:
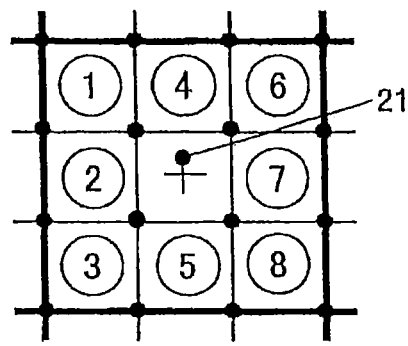
FIGS. 22A and 22B show arrangement orders of an information dot of a view (2) having the direction dot arranged in GRID1.
Figure 22B:
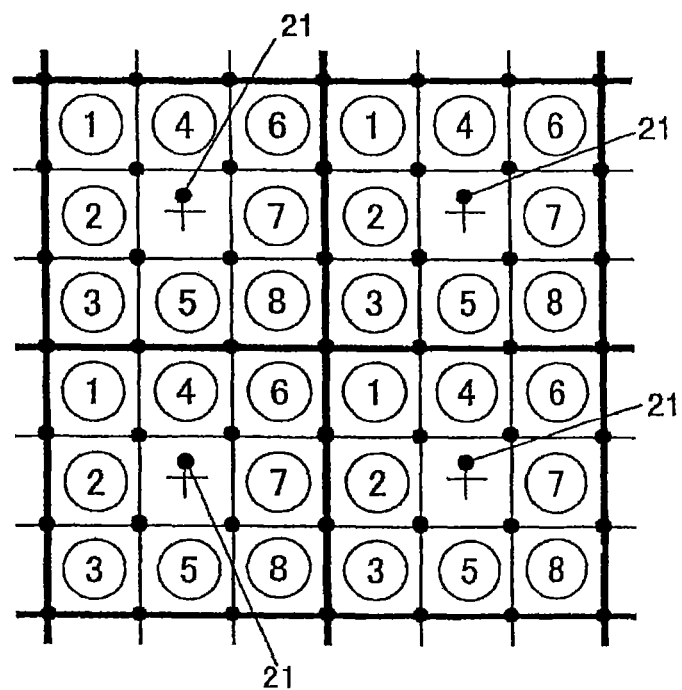

FIGS. 22A and 22B show the arrangement order for each grid area of the information dot 3 corresponding to FIGS. 21A and 21B. The arrangement order of the information dot 3 is not limited to this.

(GRID3: Arrangement Example of Direction Dot)

Figure 23A:
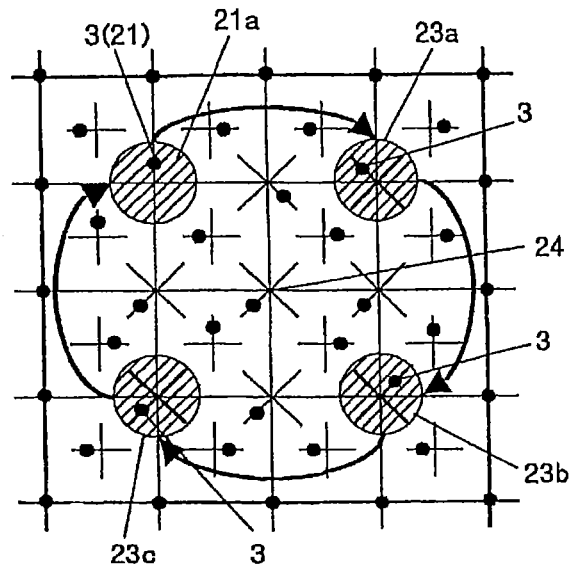
FIGS. 23A and 23B are views (1) having a direction dot arranged in GRID3.
Figure 23B:
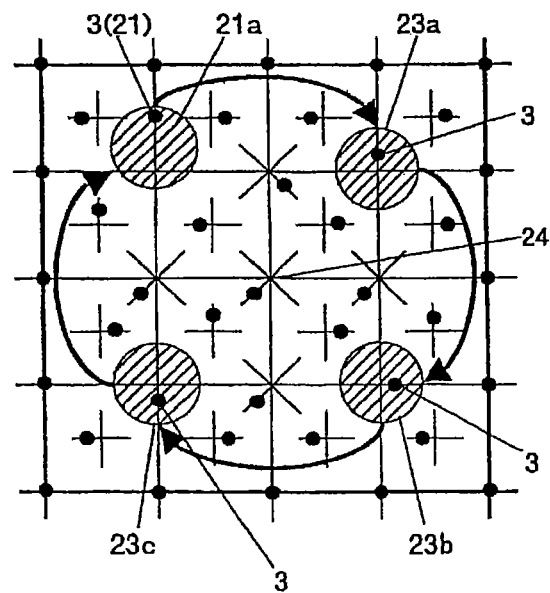

FIGS. 23A and 23B show the case that the direction dot 21 is applied to the other dot pattern (GRID3).

In GRID1, the information dot 3 is arranged in the area surrounded by four reference grid point dots, however, in GRID3, the information dot 3 is arranged also at the position of the reference grid point. In this example, it is possible to arrange the direction dot 21 within the block focusing on any reference grid point.

In FIG. 23A, the reference grid point located at the lower right, of the upper left grid area among 16 pieces of grid areas (4×4=16) is defined as the arrangement place of the direction dot 21. When the direction dot 21 is arranged at this place, at the positions rotated by 90 degrees around a center 24 of this block (23a, 23b, 23c), the direction dot 21 cannot be determined if the information dot 3 is arranged in the same direction as the direction dot 21 (the horizontal and vertical directions). Therefore, there is a possibility that the direction of the block cannot be defined.

Therefore, at the reference grid point other than the arrangement place of the direction dot 21, the information dot is arranged in the oblique direction. Thereby, it becomes easy to search the direction dot 21.

In FIG. 23A, it is defined that this block is upward when the dot is arranged at the position of the direction dot 21, namely, the dot is arranged upward from the reference grid point in this drawing.

However, the present embodiment is not limited to that the direction of the block is defined at the dot position itself, and as shown in this drawing, the direction of the block can be also defined by arranging the area where the dot is arranged in the horizontal and vertical directions at the upper left in the block itself. In this case, it is not always have to conform the dot arranged in this area to the direction of the block and it may be arranged in the right, left, and lower directions from the reference grid point. Thus, by arranging the area for defining the information in a different directional standard from the other information dot 3 (a direction area 21a: in this direction area 21a, the information dot 3 is arranged in the horizontal and vertical directions of the reference grid point, and in the area having the intersecting point, of the grid line in the other areas as the reference grid point, the dot is arranged in the oblique direction) at a predetermined position in the block in advance, the direction of the block can be defined. In other words, if the direction area 21a is arranged at the upper left, this block is upward. In addition, since the direction of the block can be defined only at the arrangement place of this area (the direction area 21a), the information dot 3 of this area (the direction area 21a) may be arranged in any direction from the reference grid point only if it is a direction different from the other information dots 3.

In addition, in FIG. 23A, the direction dot 21 can be discriminated from the arrangement direction (the oblique direction) of the information dot 3 to be arranged in the other reference grid point in the direction of the direction dot 21 (the horizontal and vertical directions). However, as shown in FIG. 23B, the present embodiment is not limited to this and due to the length from the reference grid point, the direction dot 21 can be identified. In this drawing, only the distance between the direction dot 21 and the reference grid point is set longer, and the distance between the information dot 3 at the other position (23a, 23b, 23c) and the reference grid point is set shorter.

Figure 24:
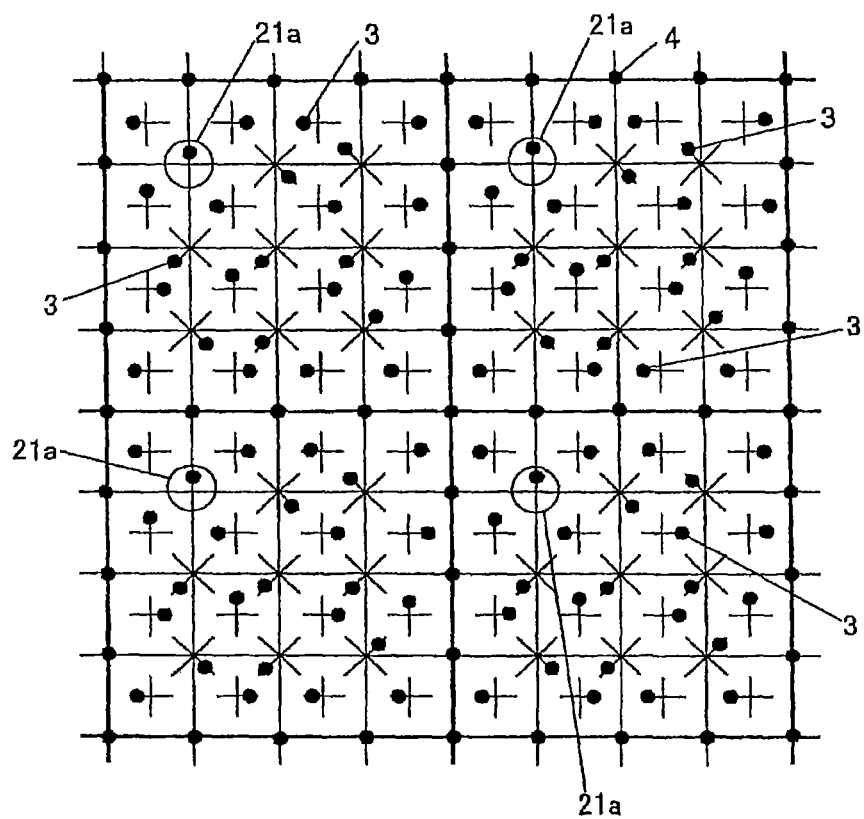
FIG. 24 is a view (2) having a direction dot arranged in GRID3.
Figure 25A:
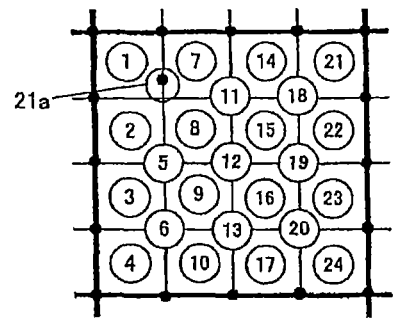
FIGS. 25A and 25B are views (1) showing arrangement orders of an information dot of GRID3.
Figure 25B:
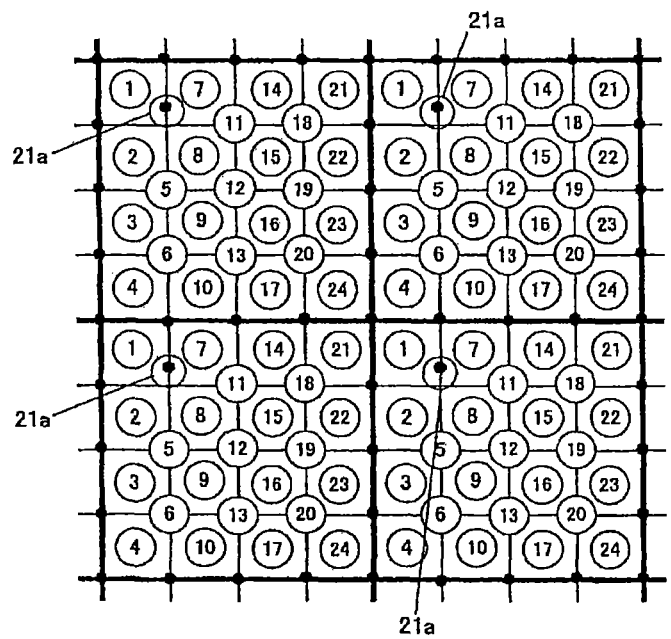

FIG. 24 shows the above-described case that two dot patterns in GRID3 are configured in the horizontal and vertical directions, and FIGS. 25A and 25B show the arrangement order of the information dot 3 corresponding to this.

Also in the case shown in FIG. 24, the area where the dots are arranged in upper, lower, right and left directions from the reference grid point (the direction area 21a) is arranged at the left upper of the block, the direction of this block can be identified.

Figure 26A:
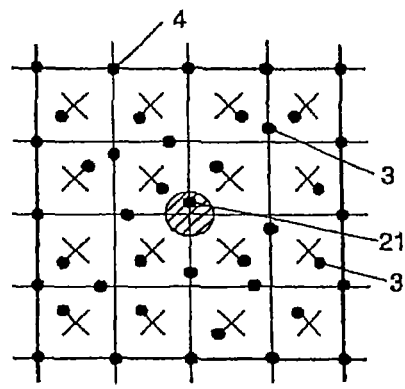
FIGS. 26A and 26B are views showing arrangement orders of a direction dot of GRID3.
Figure 26B:
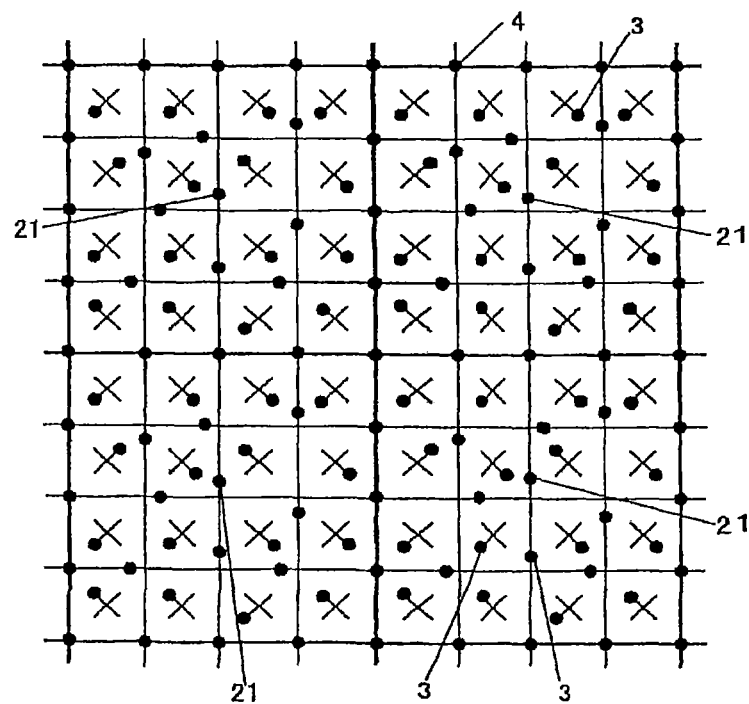

FIG. 26A and FIG. 26B show the example that the direction dot 21 is arranged at the center of the block in the dot pattern by GRID3.

Thus, by arranging the direction dot 21 at the center of the block, it is possible to freely arrange the information dot 3 in horizontal, vertical, and oblique directions on the other grid pints.

Figure 27A:
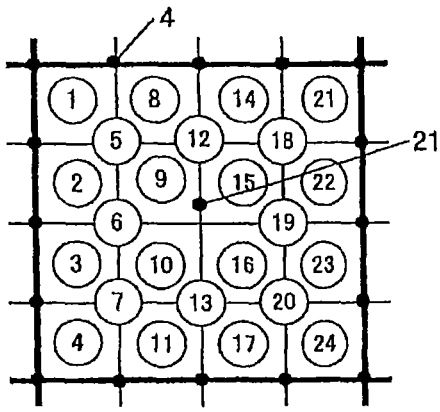
FIGS. 27A and 27B are views (2) showing arrangement orders of an information dot of GRID3.
Figure 27B:
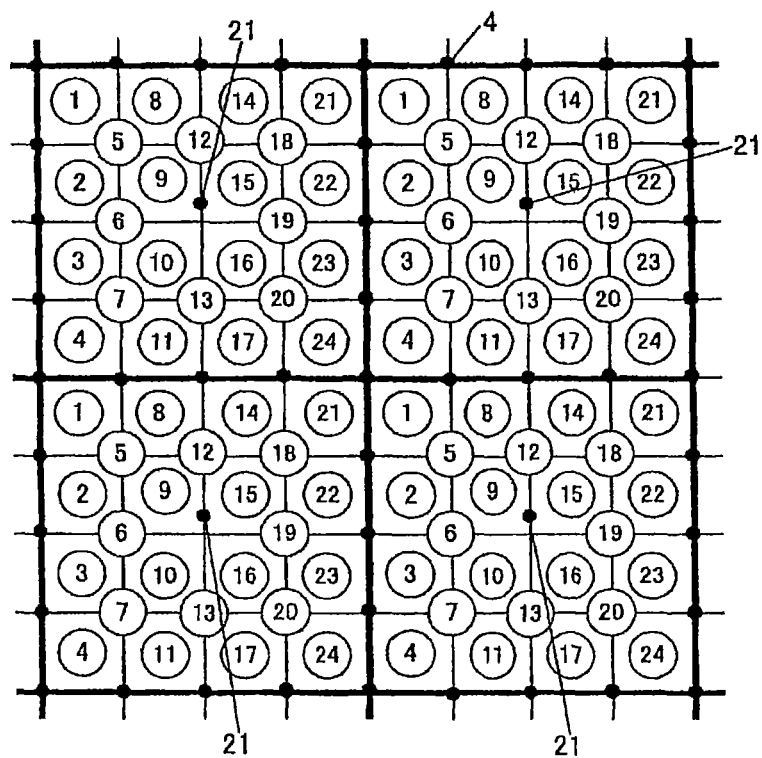

FIGS. 27A and 27B correspond to FIGS. 26A and 26B, respectively, and they illustrate the arrangement order of the information dot 3.

(GRID4: Arrangement Example of Direction Dot)

FIGS. 28 to 33 show the case that the direction dot is further applied to the other dot pattern (GRID4).

Figure 28A:
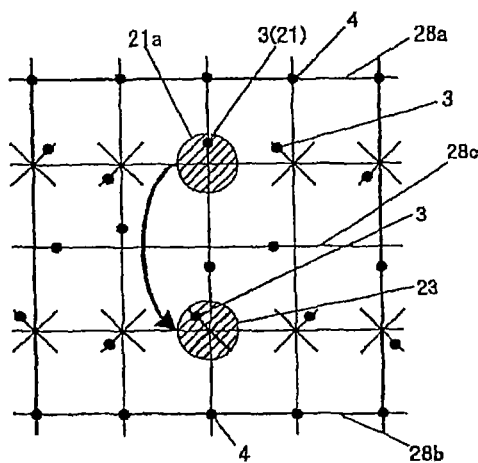
FIGS. 28A and 28B are views (1) having a direction dot arranged in GRID4.

In FIG. 28A, on this dot pattern (GRID4), the reference grid point dots 4 are arranged at even intervals on lateral grid lines 23A and 28B at the upper and lower sides of the block, and the information dots 3 are arranged centering on the grid points other than this reference grid point dot 4, respectively.

On such a dot pattern, at the area of a predetermined reference grid point at the next level of a central grid line 23c located at the mid point between the upper and lower grid lines 28a and 28b, the information dots 3 are arranged in the horizontal and vertical directions using this reference grid point as the start point, and this area becomes a direction area 21a.

At this direction area 21a, the directional standard of arrangement of the information dot 3 is different from that of the reference grid point belonging to the same grid line. In other words, the information dot 3 is arranged from the reference grid point to the oblique direction at the area of the other reference grid point. On the other hand, at the direction area 21a, the information dot 3 is arranged in the horizontal and vertical directions from the reference grid point.

Thus, in the case that the direction area 21a is arranged at the upper side with reference to the central grid line 28c, it is possible to identify that this block is upward.

At the direction area 21a, the information dot 3 can be arbitrarily arranged in the horizontal and vertical directions, however, it is obvious that the direction dot 21 in this direction area 21.a may be arranged being conformed to the direction of the block.

In addition, in the case that the direction area 21a is provided on the central grid line 28c, the dot arranged in this direction area 21a shows the direction of the block as the direction dot 21.

In such a dot pattern (GRID4), when the position of any grid point is determined to be the direction dot 21, the information dot 3 of the grid point in line symmetry around the central grid line 28c located at the mid point between the upper and lower grid lines 28a and 28b is differently arranged from the direction dot 21. In other words, the direction dot 21 is arranged being deviated from the grid point in the upper, lower, right, and left directions, and at the grid point in line symmetry with that grid point, the information dot 3 is arranged deviated from this grid point in the oblique direction.

On such a dot pattern (GRID4), since the reference grid points 4 are arranged at even intervals only on the upper and lower grid lines 28a and 28h, the longitudinal direction of this block can be identified. Next, the region where the dots are arranged in the oblique direction and the longitudinal direction at their symmetry positions with reference to the center grid line 28c, respectively, is searched. The dot in the longitudinal direction which is searched here becomes the direction dot 21.

Figure 28B:
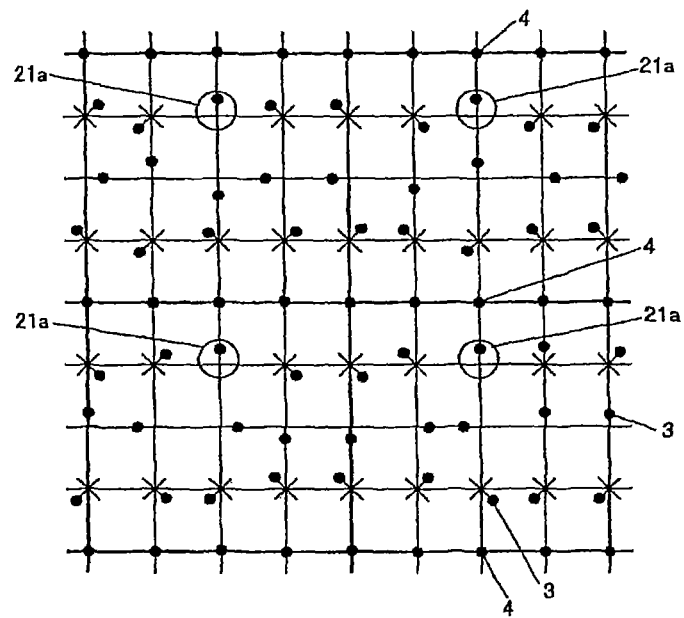

FIG. 28B is a view showing the state that two blocks as described above are arranged in parallel in horizontal and vertical directions.

In addition, FIG. 29A is an explanatory view showing an example of how to arrange the information of this dot pattern (GRID4). According to this example, the information is defined by the difference for each dot. In the present specification, it is assumed that [1] denotes a number 1 surrounded by a square in the drawing, and (1) denotes an encircled number 1 in the drawing. Here, for example, the first information [1] is defined by a value made by subtracting the value of the information dot 3 located at (1) from the value of the dot 3 located at (4). As shown in the drawing, only the grid point on which the direction dot 21 is arranged is not used as the information dot 3, however, it is possible to give a meaning of the information to this direction dot 21 by the difference in length from the grid point.

In addition, in place of the direction dot 21, as described with reference to FIG. 28A, it is obvious that the information dot 3 may be arranged in this area as the direction area 21a.

Figure 29:
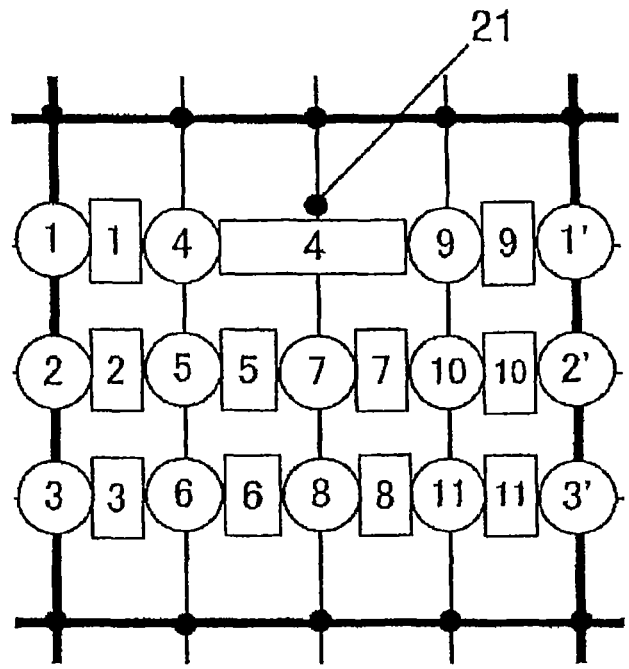
FIG. 29 is a view (1) showing an arrangement order of an information dot of GRID4.
Figure 30:
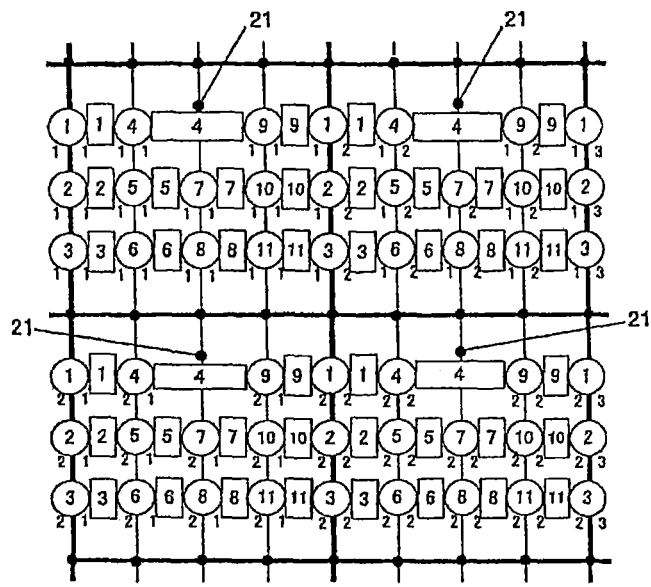
FIG. 30 is a view (2) showing an arrangement order of an information dot of GRID4.

The upper drawing of FIG. 30 shows the case that the blocks of the dot pattern shown in FIG. 29 are connected two-by-two in the horizontal and vertical directions, respectively; and the lower drawing of FIG. 30 shows the calculation of this value.

Figure 31A:
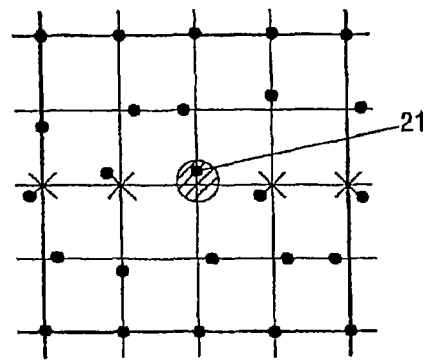
FIGS. 31A and 31B are views showing arrangement orders of a direction dot of GRID4.
Figure 31B:
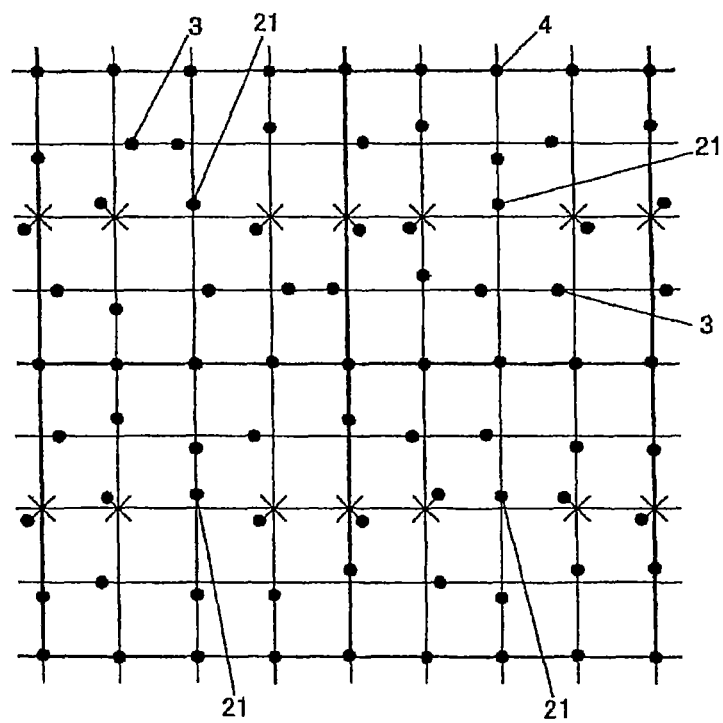

FIGS. 31A and 31B show the example that the direction dot 21 is arranged at the center of the block in the dot pattern by GRID4

Thus, by arranging the direction dot 21 at the center of the block, it is possible to freely arrange the information dot 3 on the other grid point in the horizontal and vertical directions.

Figure 32:
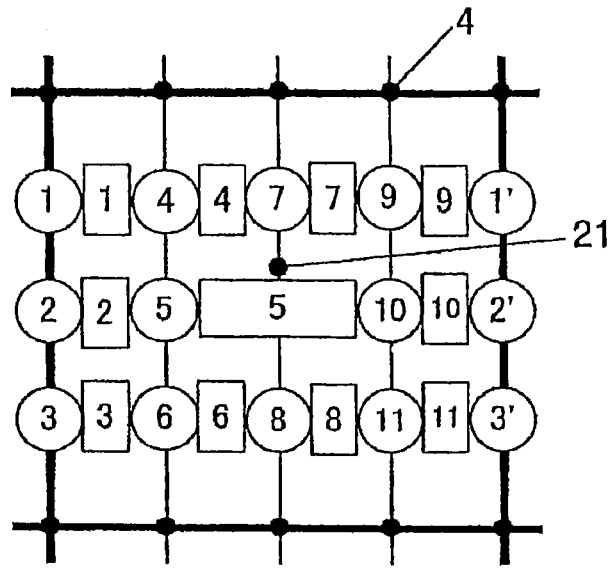
FIG. 32 is a view (3) showing an arrangement order of an information dot of GRID4.
Figure 33:
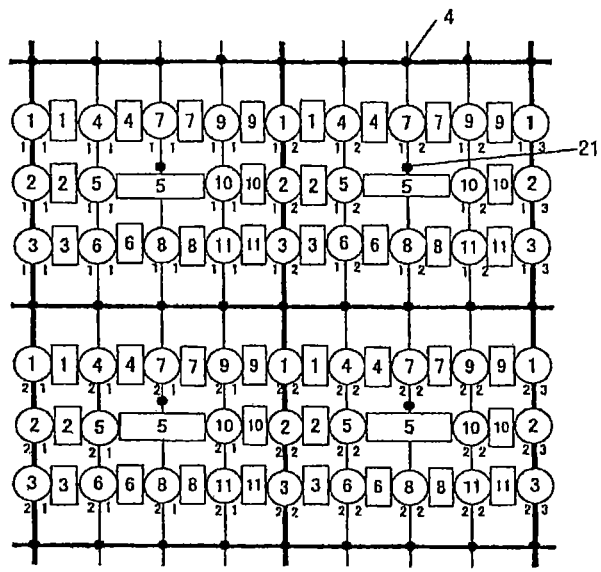
FIG. 33 is a view (4) showing an arrangement order of an information dot of GRID4.

FIGS. 32 to 33 show the arrangement of the information corresponding to FIG. 31.

(GRID1: Modified Pattern)

Figure 34A:
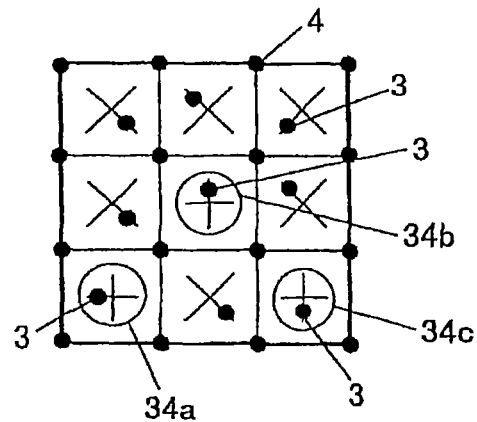
FIGS. 34A and 34B are explanatory views (1) changing how to arrange the information dot and defining direction of a block in GRID1.
Figure 34B:
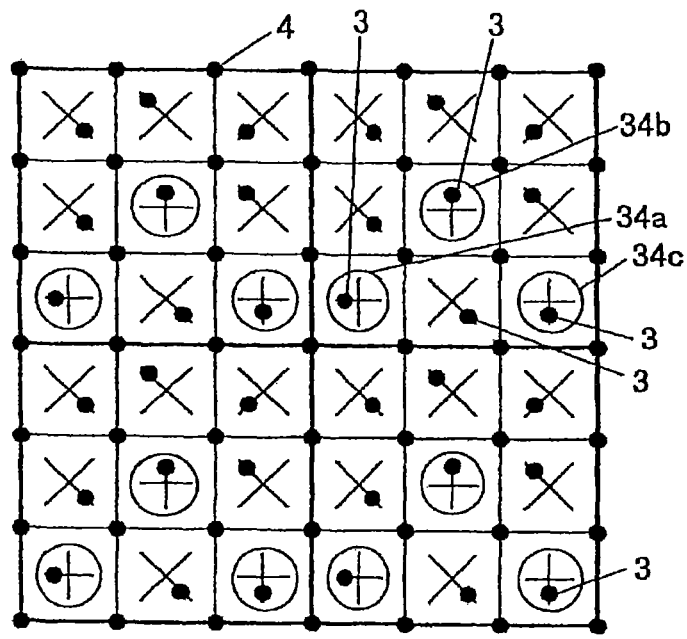

FIGS. 34A and 34B define the direction of the block only by changing the arrangement direction of the information dot 3 only of a specific grid area (the direction area) in the dot pattern of the block configured by nine pieces (3×3=9) of the grid area into the arrangement direction of the other grid area (the direction area) on the dot pattern of GRID1.

In other words, in FIG. 34A, the information dots 3 are arranged in the horizontal and vertical directions from the centers of a left lower grid area 34a, a center grid area 34b, and a left lower grid area 34c, respectively, and in the other grid area, the information dot 3 is arranged from its center to the oblique direction. Thus, by arranging the grid areas 34a, 34b, and 34c, it can be recognized that this block is upward from a shape of a triangle connecting these grid areas, namely, a relation of an apex 34b with respect to bottom sides 34a and 34c.

Thus, it is possible to define the direction of the block depending on the arrangement relation (here, a triangle) of the grid areas 34a, 34b, and 34c (wherein the information dots 3 are arranged from their centers in the horizontal and vertical directions), of which arrangement directions of the information dot 3 in the block are changed. Thereby, the information dot 3 can be arranged in the all grid areas in the block without sacrificing the grid area for the key dot.

Further, FIG. 34B shows the state that the blocks shown in FIG. 34A are connected two-by-two in the horizontal and vertical directions.

Figure 35A:
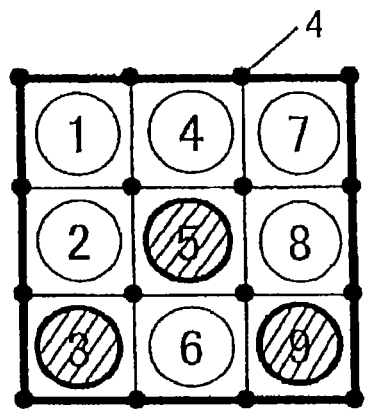
Figure 35B:
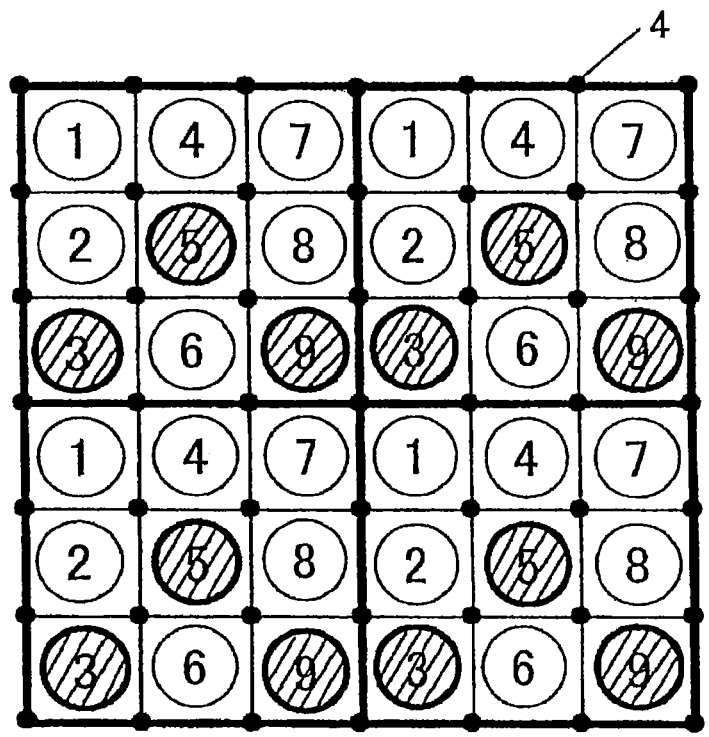

FIGS. 35A and 35B show the state that the information dot 3 is arranged corresponding to FIGS. 34A and 34B.

Figure 36A:
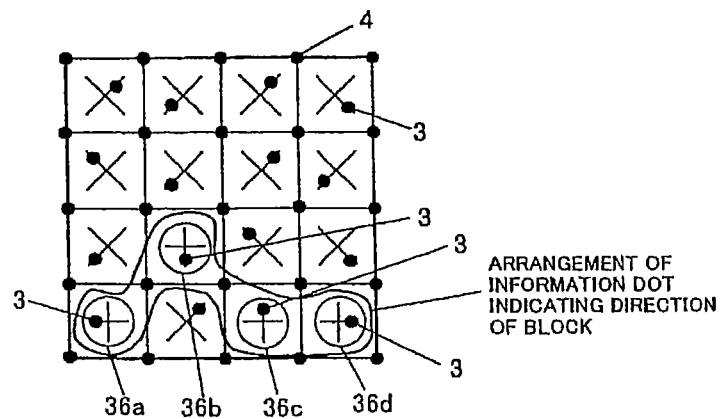
FIGS. 36A and 36B are explanatory views (3) changing how to arrange the information dot and defining a direction of a block in GRID1.

FIG. 36A is a modification of FIG. 34A. In the dot pattern of the block composed of 16 pieces of grid areas (4×4=16), the information dot 3 is arranged from the center of the grid area into the horizontal and vertical directions only in specific grid areas 36a, 36b, 36c, and 36d and then, these grid areas are chanted into the other grid area (wherein the information dot 3 is arranged from the center into the oblique direction). In this way, the direction of the block is defined. In this block, the grid areas 36a, 36c, and 36d are linearly arranged in parallel with the bottom side and the grid area 36b is only protruded. Accordingly, it is known that the direction of this block is the protrusion direction of the grid area 36b, namely, upward.

Figure 36B:
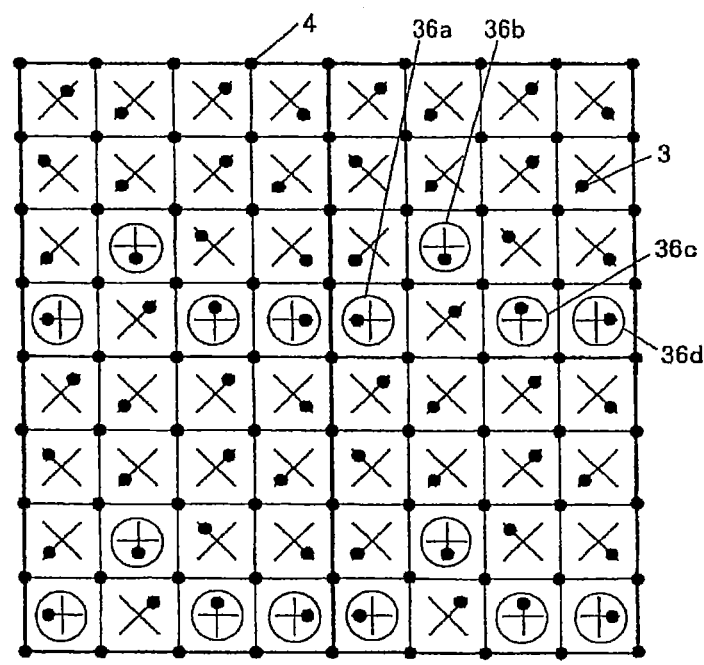

Further, FIG. 36B shows the state that the blocks shown in FIG. 36A are connected two-by-two in the horizontal and vertical directions.

Figure 37A:
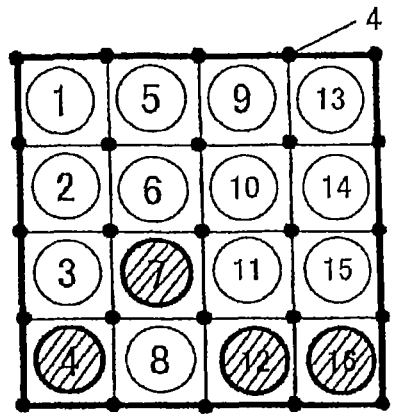
FIGS. 37A and 37B are explanatory views (4) changing how to arrange the information dot and defining a direction of a block in GRID1.
Figure 37B:
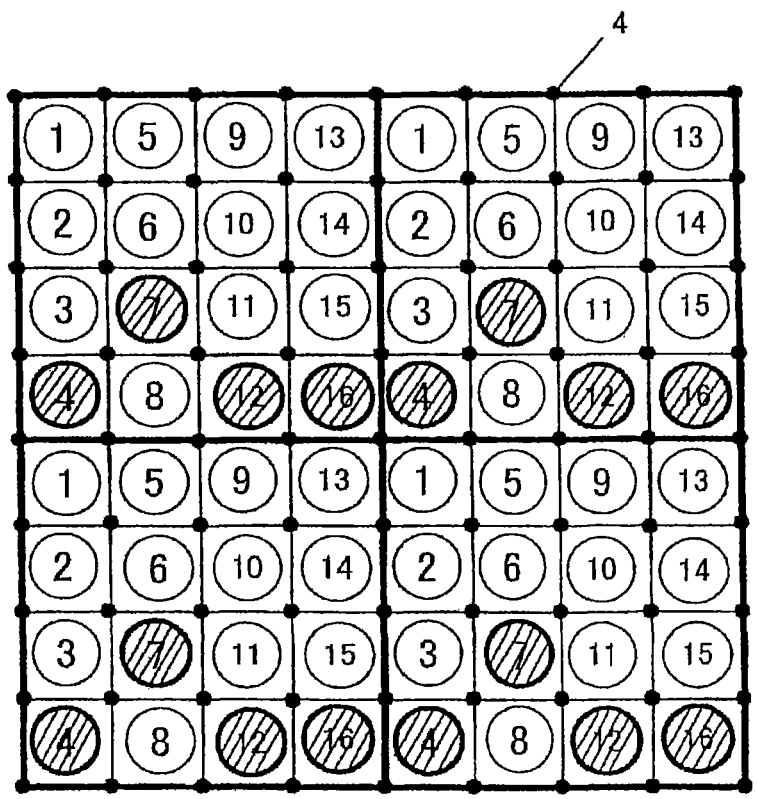

FIGS. 37A and 37B show the state that the information dot 3 is arranged corresponding to FIGS. 36A and 36B.

Thus, as shown in FIGS. 34 to 37, the direction of the block is defined by changing the arrangement direction of the information dot 3 into that of the other grid area only in a specific grid area, the information dot 3 can be arranged in the all grid areas by defining the direction of the block without sacrificing the grid area for the key dot.

Figure 38A:
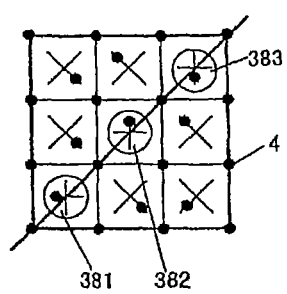
FIGS. 38A, 38B, and 38C are views (1) showing an arrangement examples when the block and the direction cannot be defined.
Figure 38B:
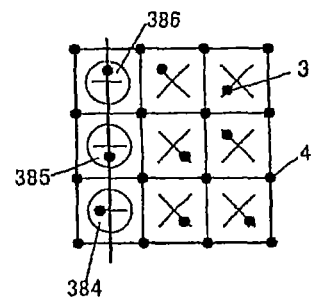
Figure 38C:
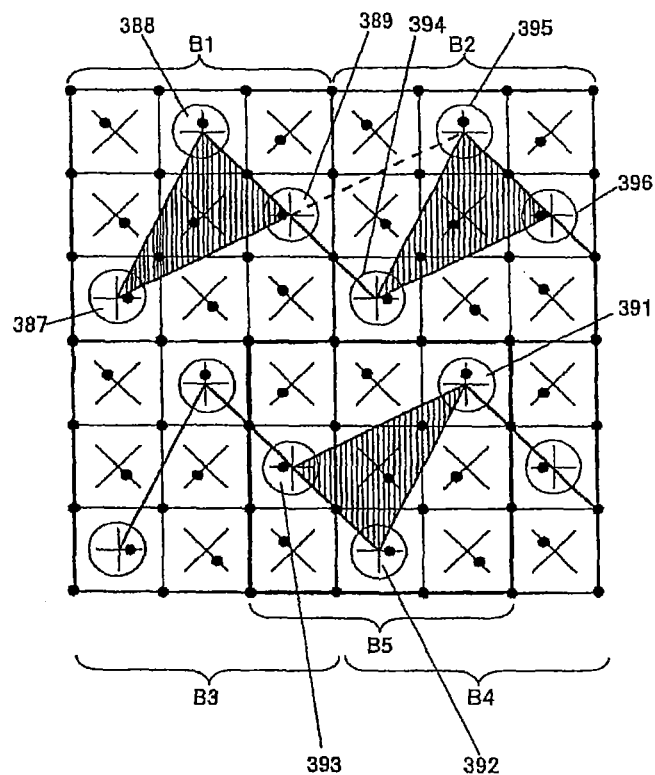
Figure 39:
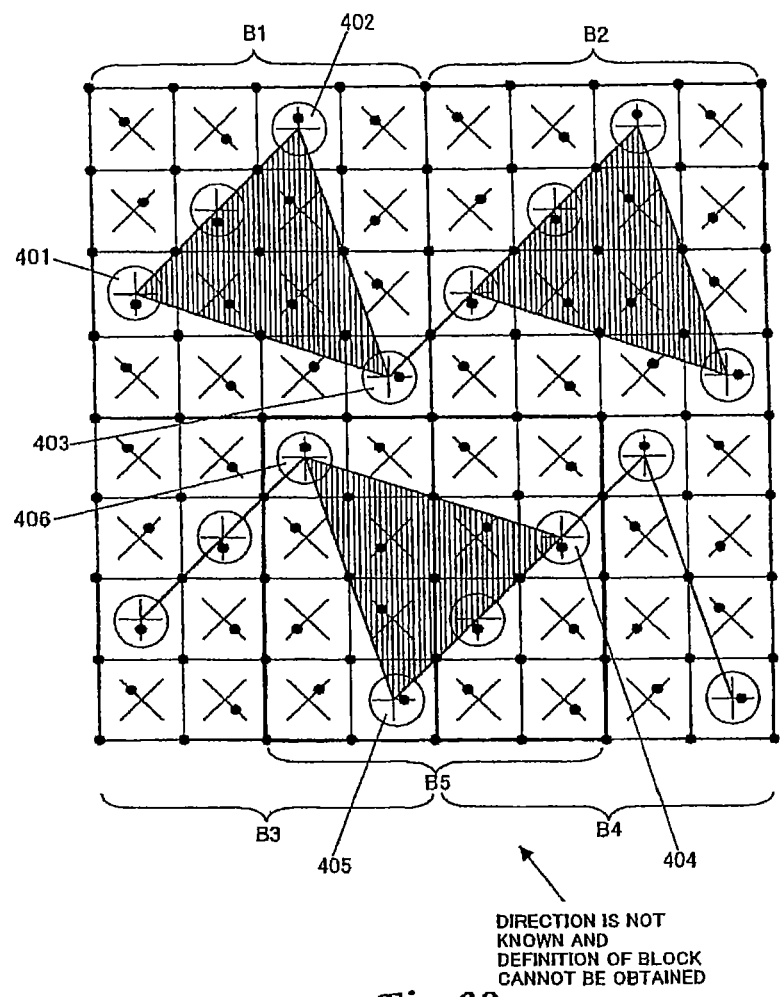
FIG. 39 is a view (2) showing an arrangement example when the block and the direction cannot be defined.

FIG. 38 and FIG. 39 show the example that the direction of the block cannot be defined even if the grid area is arranged as described with reference to FIGS. 34 to 37.

In other words, in the case of FIG. 38A, grid areas 381, 382, and 383 wherein the information dot 3 is arranged being deviated in the horizontal and vertical directions of the grid point are linearly continued in the oblique direction of the block, and when a line connecting these specific grid areas is also linearly connected to the other block, the direction of the block cannot be defined. In addition, in the case of FIG. 38B, grid areas 384, 385, and 386 wherein the information dot 3 is arranged being deviated in the horizontal and vertical directions of the grid point are linearly continued in the upper and lower directions of the block, so that the direction of the block cannot be defined.

Further, in the case of FIG. 380, grid areas 387, 388, and 339 wherein the information dot 3 is arranged being deviated in the horizontal and vertical directions of the grid point configures a triangle. However, the figures made by rotating this triangle by 180 degrees (for example, 395, 394, 389 or 391, 392, 393) appear across blocks, so that the block itself cannot be defined (there is a possibility to recognize a block B5 by error) and is cannot be determined if its direction is upward or downward.

In the same way, in FIG. 39, a line grid areas 401, 402, and 403 wherein the information dot 3 is arranged being deviated in the horizontal and vertical directions of the grid point configures a triangle. However, the figures made by rotating this triangle by 180 degrees (for example, 404, 405, 406) appear across blocks B3 and B4, so that there is a possibility to recognize the block B5 which is not a block originally by error, the block cannot be defined correctly, and it cannot be determined if its direction is upward or downward.

Figure 40A:
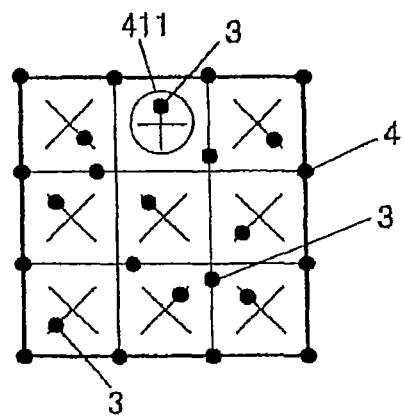
FIGS. 40A and 40B are explanatory views (1) changing how to arrange the information dot and defining a direction of a block in GRID3.

FIG. 40A is a modified example of a dot pattern (GRID3) described with reference to FIG. 23. In this drawing, the reference grid point dots 4 are arranged at even intervals on the grid line configuring the outer circumference of the block; the grid lines connecting these reference grid point dots 4 in the horizontal and vertical directions are arranged; and assuming that the intersecting point of the grid lines to be a virtual grid point, the area surrounded by four virtual grid points is defined as a grid area. The information dot 3 having the length and the direction (the vector) is arranged with reference to the center of this grid area. Then, with reference to the virtual grid point, the information dot 3 is arranged. Here, with respect to the grid area, only in an upper center grid area 411, the information dot 3 deviated from the central point, into the horizontal and vertical direction is arranged, and in the other grid area, the information dot 3 deviated from the central point into the oblique direction is arranged. In this case, it is known that this block is upward from the arrangement position of this grid area 411.

Thus, the direction of this block can be identified depending on where the grid area 411 having the information dot 3 arranged in a specific direction is arranged in the block.

As described above, it is also possible to identify the direction of the block only from the place where the grid area 411 as the direction area is arranged in the block.

In other words, in the case of FIG. 40A, only in the grid area 411, the directional standard of the dot arrangement is the horizontal and vertical directions, so that it can be said that this grid area 411 is the direction area.

In this case, since this direction area is arranged at the upper center, it is possible to identify that this block is upward. Further, in the case that the grid area 411 is deemed to be the direction area in this way, it is not always necessary to conform the information dot 3 which is arranged in the grid area 411 to the direction of the block. Therefore, within this grid area 411, it is also possible to arrange the information dot at the vector end point, namely, left, right, or the lower direction using the central point (the virtual reference point) as the start point.

In addition, it is obvious that the information dot 3 to be arranged in the grid area 411 is defined as the direction dot 21. In this case, it is possible to define the direction of the block due to the direction from the central point of the grid area 411. In this case, the grid area 411 where the direction dot 21 is arranged may be located at any place in the block.

Figure 40B:
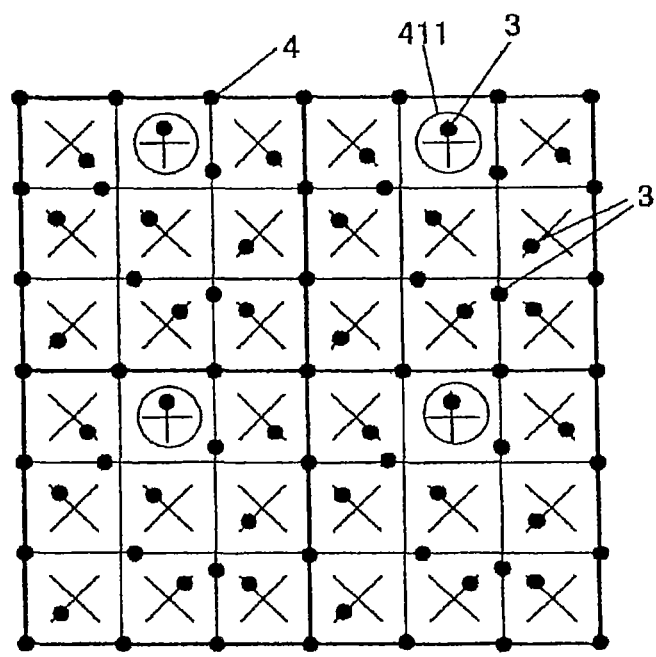

Further, FIG. 40B shows the state the blocks shown in FIG. 40A are connected two-by-two in the horizontal and vertical directions.

Figure 41A:
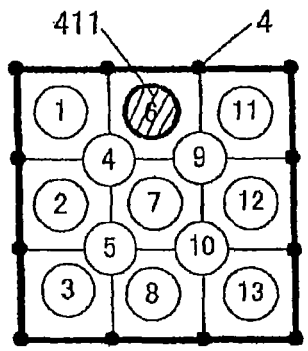
FIGS. 41A and 41B are explanatory views (2) changing how to arrange the information dot and defining a direction of a block in GRID3.
Figure 41B:
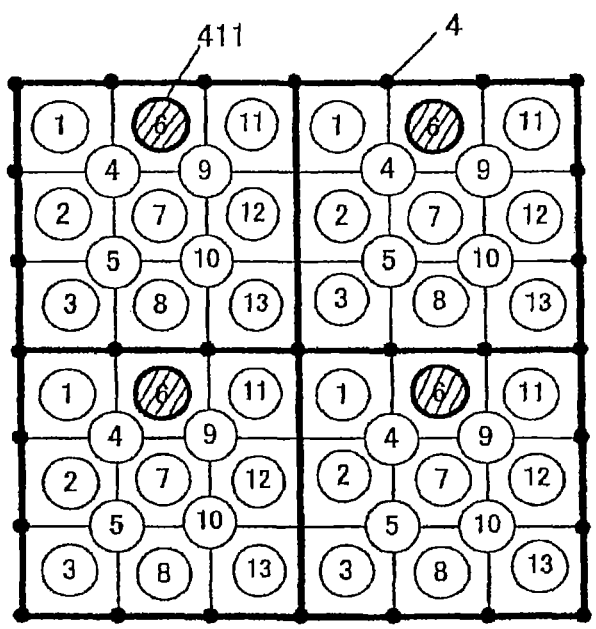

FIGS. 41A and 41B show the arrangement order of the information dot 3 corresponding to FIGS. 40A and 40B.

Figure 42A:
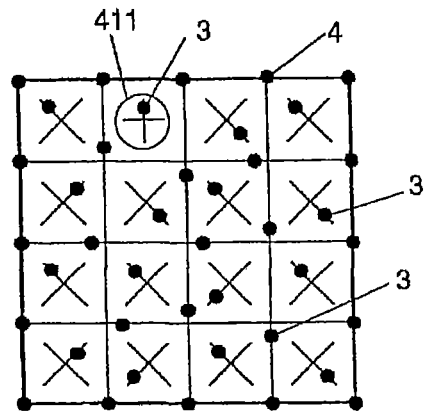
FIGS. 42A and 42B are explanatory views (3) changing how to arrange the information dot and defining a direction of a block in GRID3.
Figure 42B:
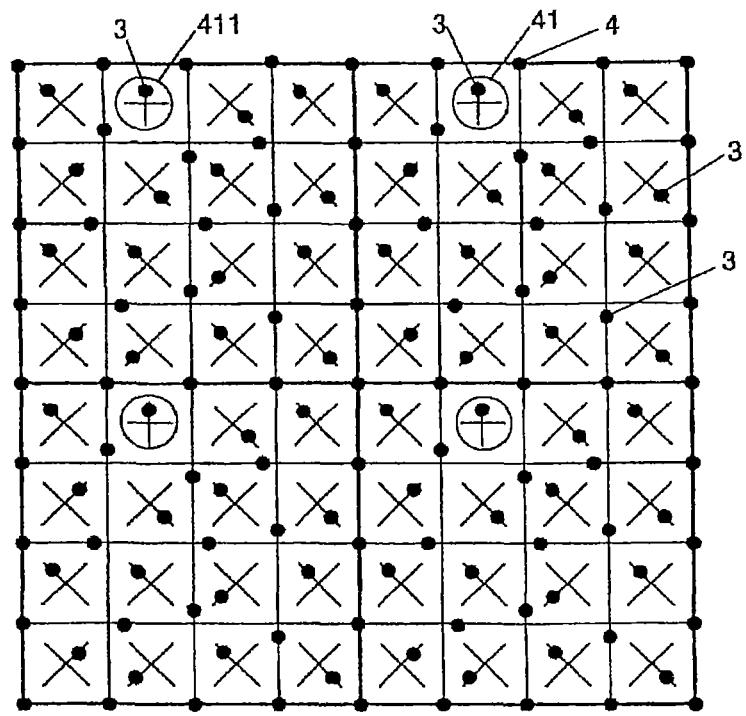

FIG. 42A shows the dot pattern described with reference to FIG. 40A by the block composed of 16 (4×4=16) pieces of grid areas. FIG. 42B shows the state that these blocks are connected two-by-two in the horizontal and vertical directions.

Since the directional standard of the dot arrangement is the horizontal and vertical directions only in the grid area 411 also in FIGS. 42A and 42B as same as the above-described FIG. 40A, this grid area 411 can be deemed to be a direction area.

In this case, since this direction area (the grid area 411) is arranged at the position shown in FIG. 42A, it is possible to identify that this block is upward. Further, in the case that the grid area 411 is deemed to be the direction area in this way, it is not always necessary to conform the information dot 3 to be arranged in the grid area 411 to the direction of the block. Therefore, within this grid area 411, it is also possible to arrange the information dot 3 at the vector end point, namely, left, right, or the lower direction using the central point (the virtual reference point) as the start point.

Figure 43A:
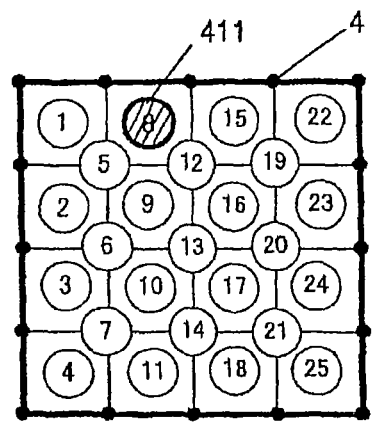
FIGS. 43A and 43B are explanatory views (4) changing how to arrange the information dot and defining a direction of a block in GRID3.
Figure 43B:
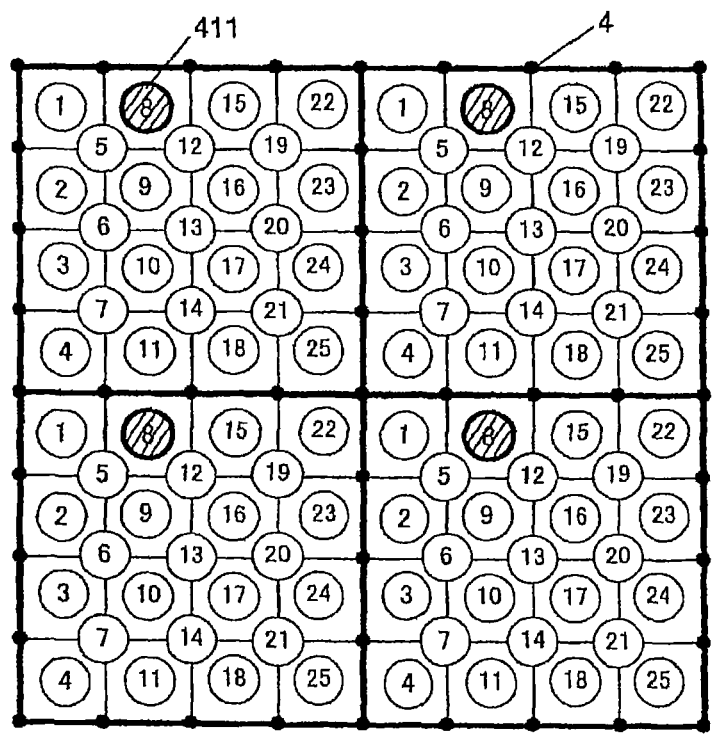

FIGS. 43A and 43B show the arrangement order of the information dot 3 corresponding to FIGS. 42A and 42B.

Figure 44A:
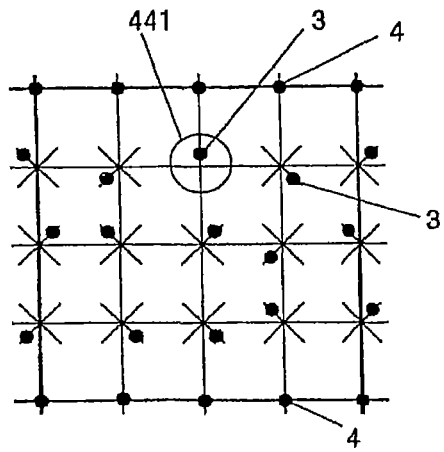
FIGS. 44A and 44B are explanatory views (1) changing how to arrange the information dot and defining a direction of a block in GRID4.

FIG. 44A is a modified example of the dot pattern (GRID4) described with reference to FIG. 28A. In this dot pattern, the information dot 3 is arranged at the position deviated from the grid point in the horizontal and vertical directions only in the predetermined area 441, and in the other grid points, the information dot 3 is arranged at the position deviated from the grid point in the oblique direction.

Thus, by differentiating the directional standard (the horizontal and vertical directions) for arranging the information dot 3 from the information dot 3 in the other grid points (the oblique direction) defining this area 441 as the direction area, it is possible to recognize the direction of this block (here, upward).

The information dot 3 to be arranged in this area 441 may be arranged at the arbitrary position within the horizontal and vertical directions, however, it is obvious that the direction of the block may be indicated defining this information dot 3 itself as the direction dot 21.

Figure 44B:
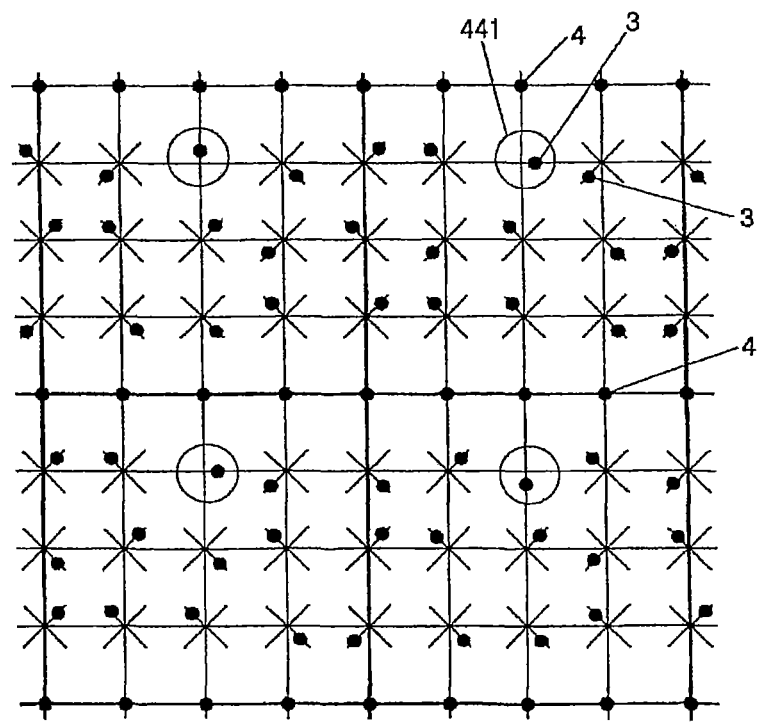

FIG. 44B shows the state that the blocks described with reference to FIG. 44A are connected two-by-two in the horizontal and vertical directions.

Figure 45:
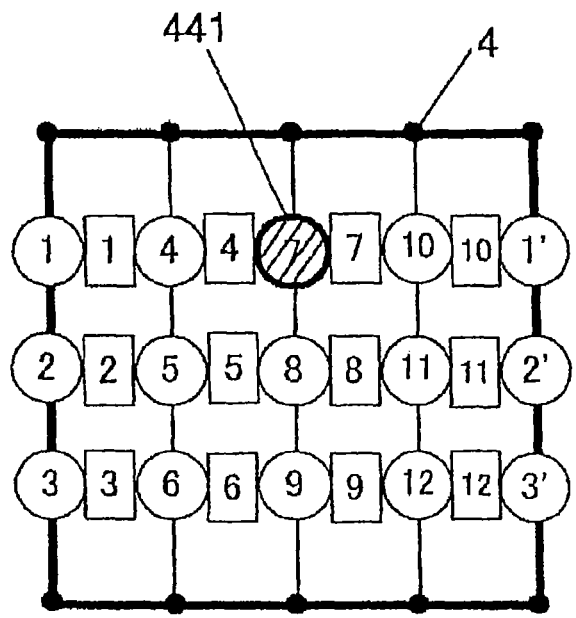
FIG. 45 is an explanatory view (2) changing how to arrange the information dot and defining a direction of a block in GRID4.
Figure 46:
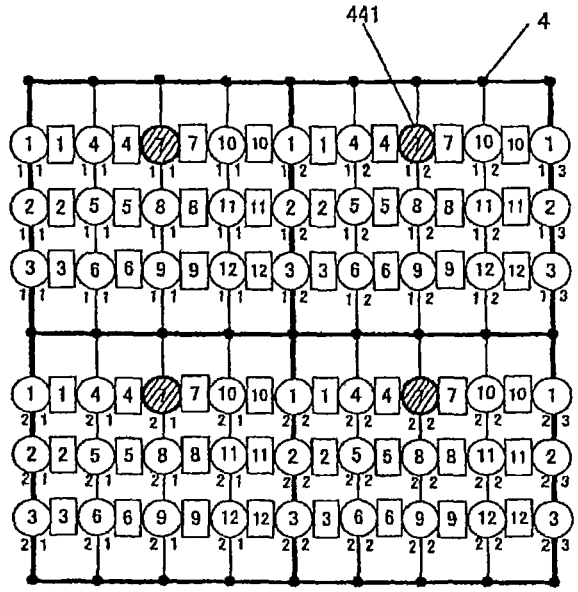

FIG. 45 is an explanatory view illustrating the arrangement state of the information dot 3 corresponding to FIG. 44A; FIG. 46 is an explanatory view illustrating the arrangement state of the information dot 3 corresponding to FIG. 44E.

Thus, also in the case of the dot pattern by GRID4, without sacrificing a specific grid point for the key dot, the information dot 3 can be arranged with reference to the all grid points.

(Other Embodiment of Direction Dot)

FIGS. 48 to 55 will illustrate the other embodiment(s) of the direction dot.

Figure 48:
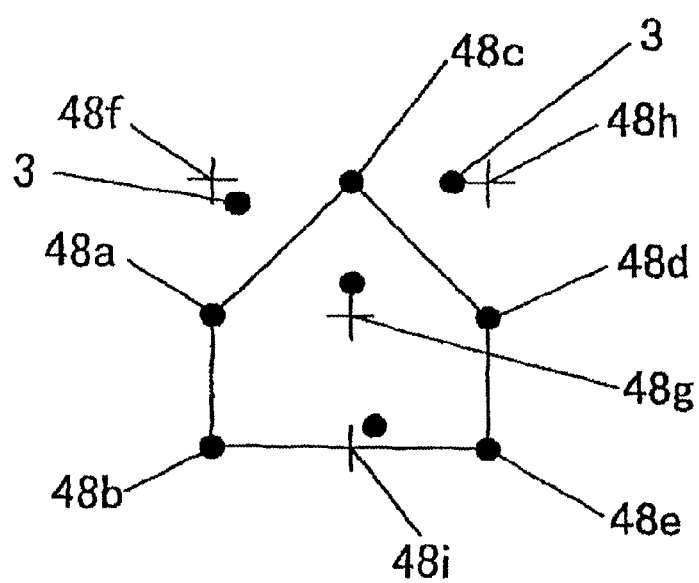
FIG. 48 is an explanatory view (1) defining a direction of a block depending on how to arrange a reference point in a block having a shape thereof other than a grid.

FIG. 48 defines the direction in the block of which shape is other than the grid shape.

In this drawing, at first, reference points 48a to 48e are arranged. The shape indicating the direction of the block (here, an upward pentagon-shape) by a line connecting these reference points 48a to 48e is defined. Then, on the basis of this reference point, virtual reference points 48f, 48g, and 48h are arranged, and the information dot 3 is arranged at the vector end point having the direction and the length using these virtual reference points as the start point and the end point. Thus, it is possible to define the direction of the block depending on how to arrange the reference point in this drawing. Then, by defining the direction of the block, the size of the entire block is defined.

Figure 57:
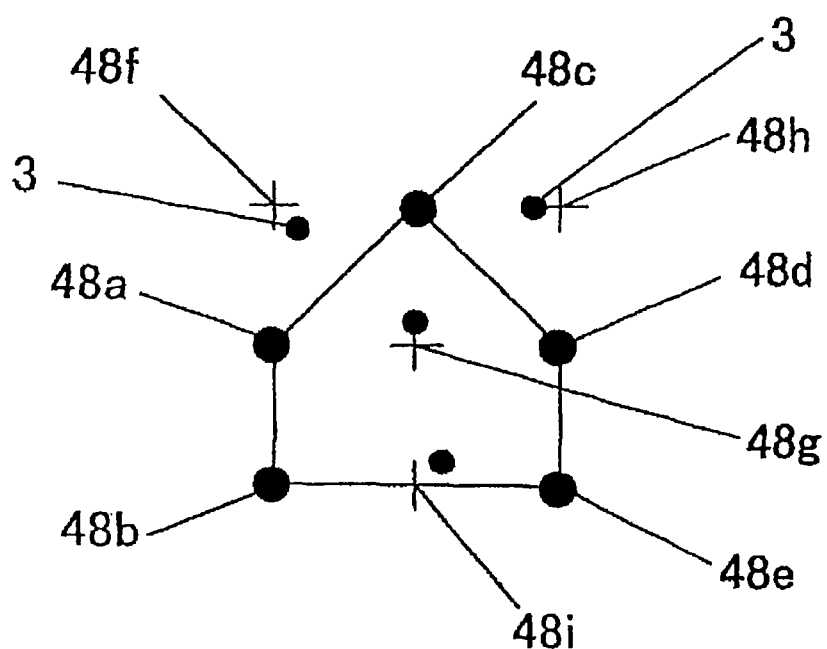
FIG. 57 is an explanatory view changing a size of a reference point and defining a direction of a block in a block having a shape thereof other than the grid.

In FIG. 48, the reference points 48a to 48e and the information dot 3 are described assuming that all of them have the same shapes. However, as shown in FIG. 57, the reference points 48a to 48e may be larger than the information dot 3. In addition, these reference points 48a to 48e and the information dot 3 may have any shapes if they can be identified and a triangle, a square, and other polygons may be available.

Figure 49:
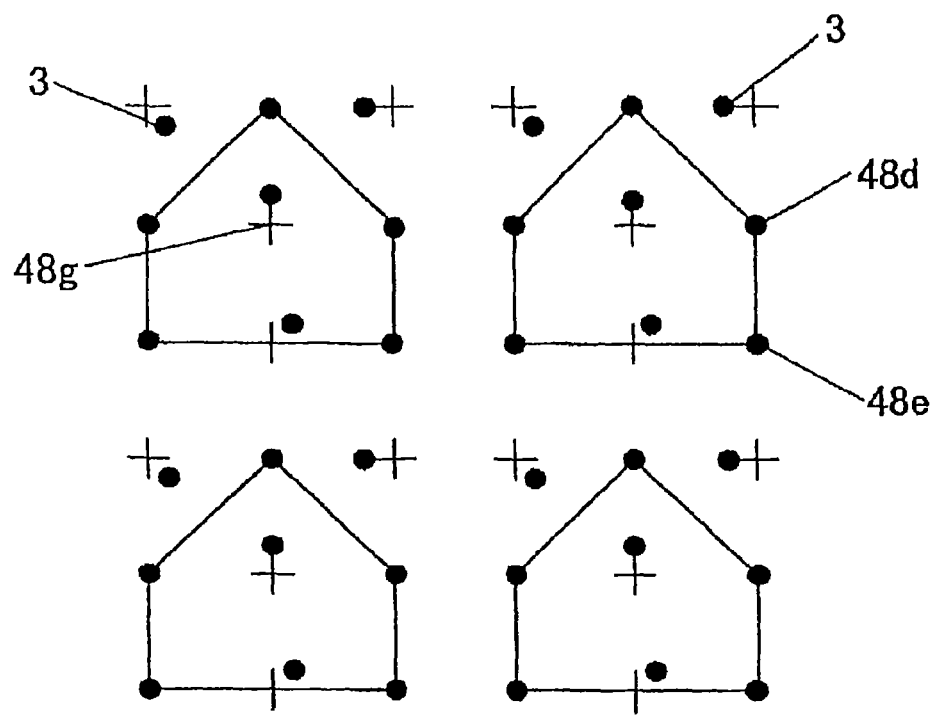
FIG. 49 is an explanatory view (2) defining the direction of the block depending on how to arrange a reference point in the block having a shape thereof other than a grid.

FIG. 49 shows the state that the blocks shown in FIG. 48 are connected two-by-two in the horizontal and vertical directions.

Figure 50:
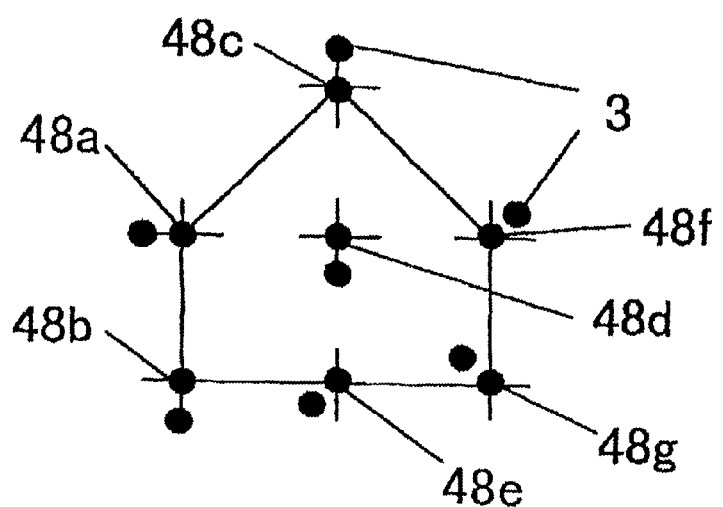
FIG. 50 is an explanatory view (1) defining a direction of a block depending on how to arrange a reference point when the shape of the block is not a rectangular area and partial reference points coincide with partial reference grid points.
Figure 51:
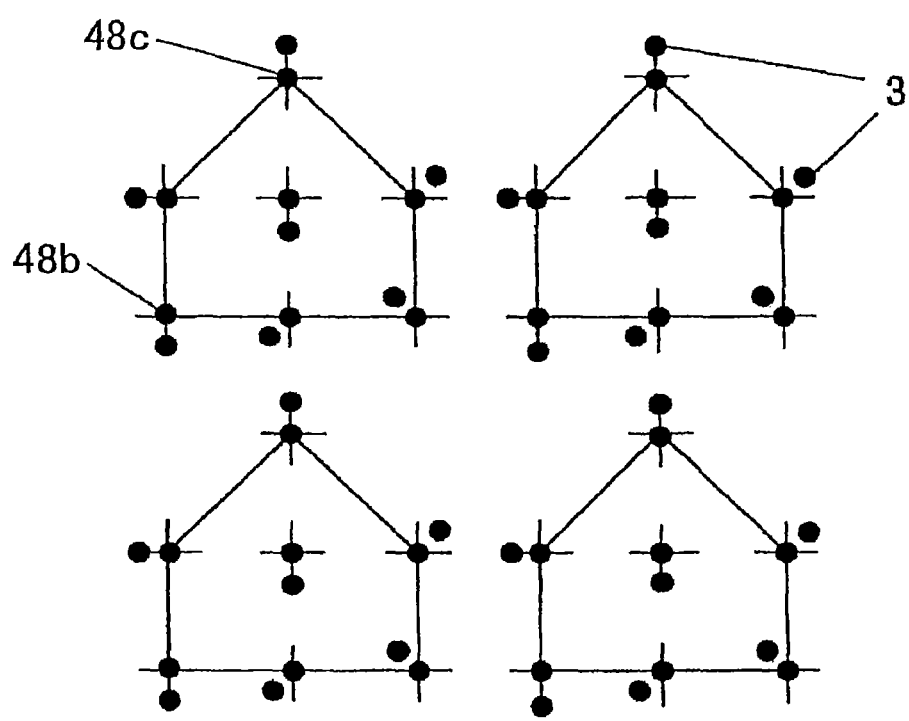
FIG. 51 is an explanatory view (2) defining the direction of the block depending on how to arrange a reference point when the shape of the block is not a rectangular area and partial reference points coincide with partial reference grid points.

FIG. 50 and FIG. 51 show the case that the shape of the block is not made into the grid shape, namely, the rectangular shape and the reference points partially coincide with the virtual reference points.

In other words, 48a, 48h, 48c, 48d, 48e, 48f, and 48g arranged in FIG. 48 can be deemed to be a reference point, and a virtual reference point, at the same time. Therefore, in FIG. 50, the information dot 3 is arranged at the end point of the vector having each point as the start point. Then, in a pentagon-shape composed of 48a, 48h, 48c, 48f, and 48g, it is possible to recognize that this block is upward since 48c is the apex.

FIG. 51 shows the state that the blocks shown in FIG. 50 are connected two-by-two in the horizontal and vertical directions.

Figure 52:
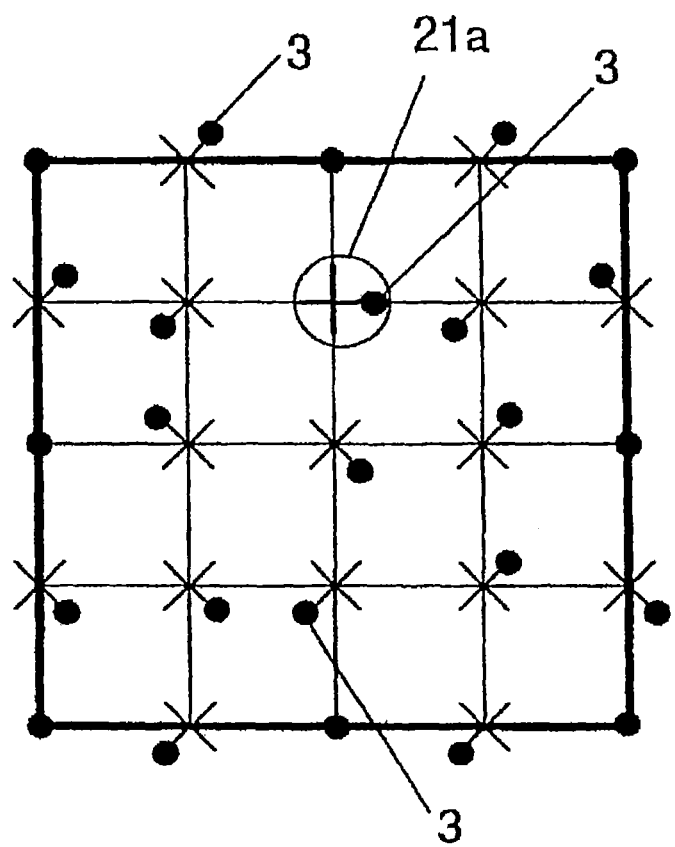
FIG. 52 is an explanatory view (1) changing how to arrange an information dot and defining a direction of a block in a block having reference points arranged at four corners of the block.
Figure 53:
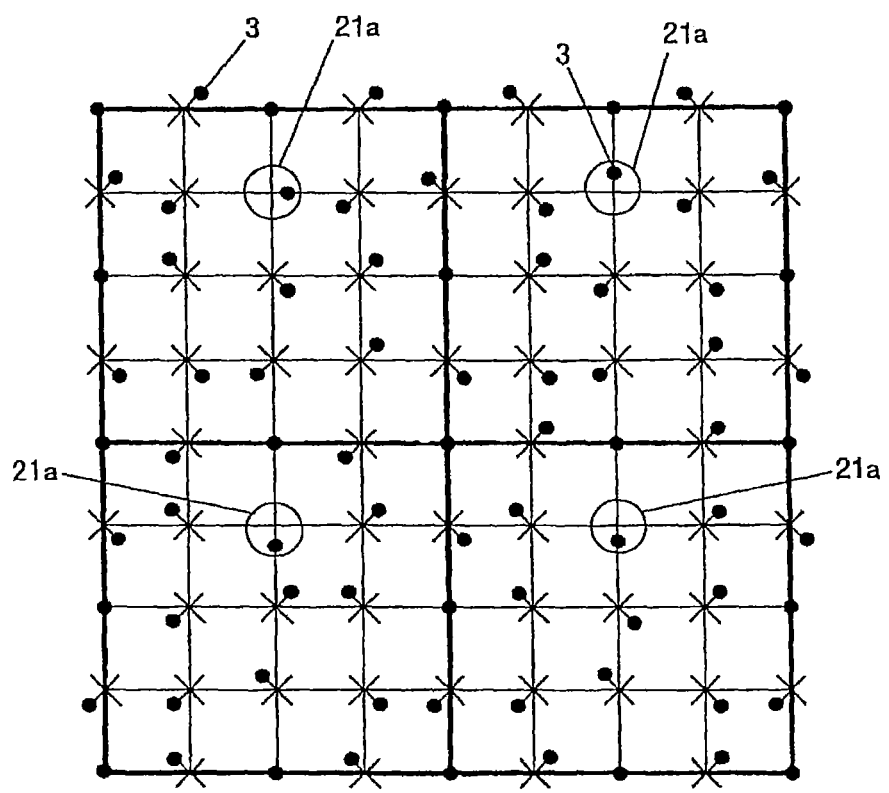
FIG. 53 is an explanatory view (2) changing how to arrange an information dot and defining a direction of a block in the block having reference points arranged at four corners of the block.

FIG. 52 and FIG. 53 show the case that the direction of the block is defined by arranging the information dot in a directional standard different from other one.

In these drawings, the reference points are arranged at the four corners of the block. The direction of the block 3 is defined by differentiating the direction of the information dot 3 in the direction area 21a among the information dots 3 arranged centering on the virtual reference point from the directional standard of the other information dots. In other words, only in the direction area 21a, the information dot 3 is arranged at the position deviated from the virtual reference point into the horizontal and vertical directions, and in the other areas, the information dot 3 is arranged at the position deviated from the virtual reference point into the oblique direction. In FIG. 52, since the direction area 21a is arranged at the position (a +Y direction) deviated upward from the block center, it is known that this block is upward. In the case that the direction of the block is defined depending on the position of the direction area 21a in the block in this way, the information dot 3 in the direction area 21a may be arbitrarily arranged. In other words, in this drawing, the information dot 3 is arranged at the vector end point in the right direction from the virtual reference point.

FIG. 53 shows the state that the blocks shown in FIG. 52 are connected two-by-two in the horizontal and vertical directions.

Figure 54:
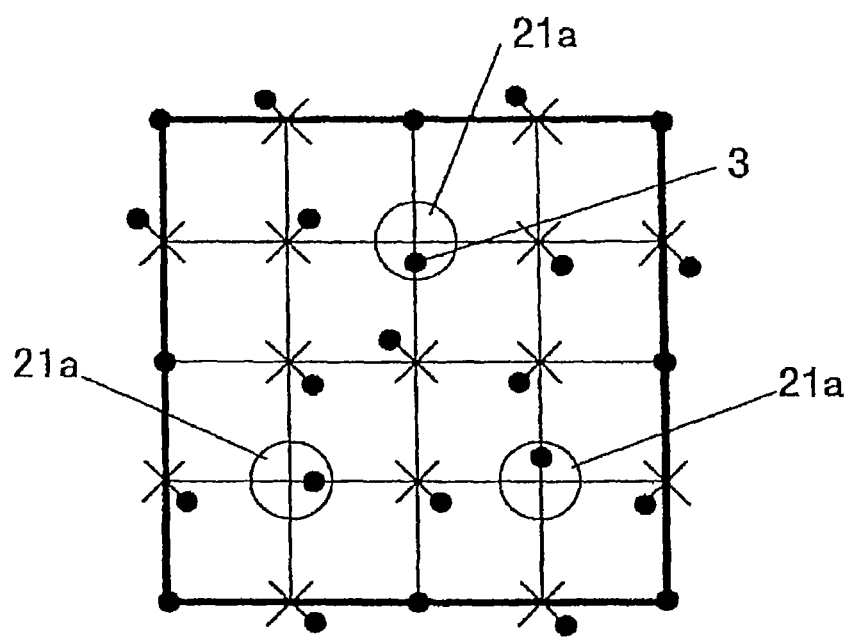
FIG. 54 is an explanatory view (3) changing how to arrange an information dot and defining a direction of a block in the block having reference points arranged at four corners of the block.
Figure 55:
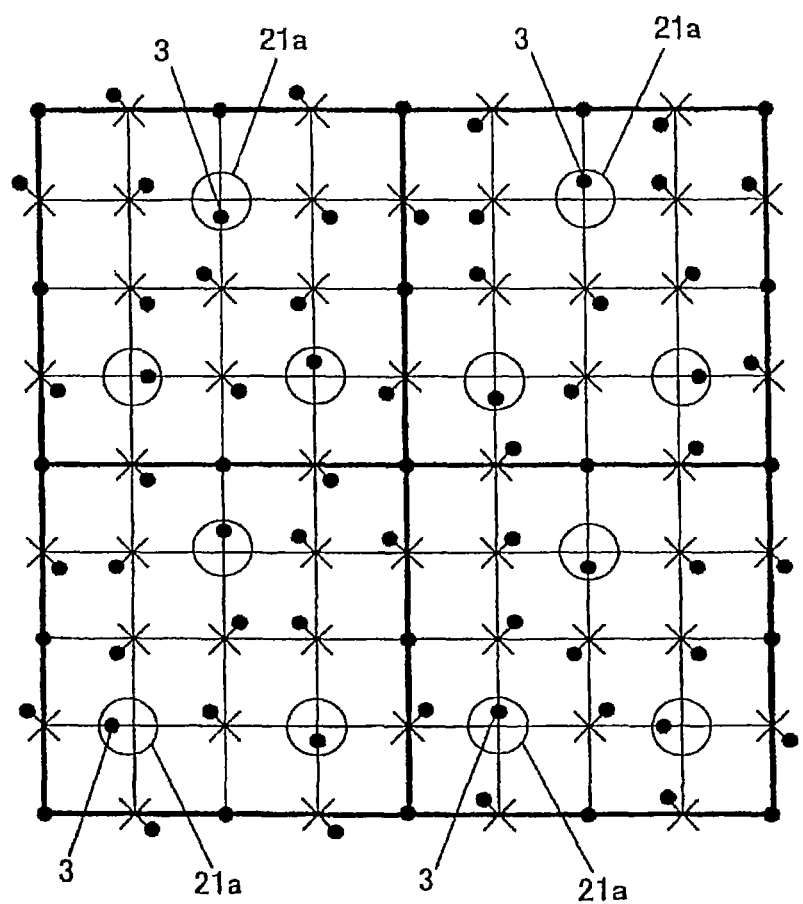
FIG. 55 is an explanatory view (4) changing how to arrange an information dot and defining a direction of a block in the block having reference points arranged at four corners of the block.

FIG. 54 and FIG. 55 show the case that the direction of the block is defined by arranging the information dot in the directional standard different from the other directional standards in a plurality of areas.

In these drawings, the reference points are arranged at the four corners of the block. In this block, by differentiating the directional standards in the arrangement of the information dots 3 at three positions among the information dots 3 which are arranged centering on the virtual reference point from that of other areas, these three positions are deemed to be the direction areas 21a, and then, the direction of the block is defined by the shape of the line connecting these direction areas 21a. In other words, in these drawings, from the shape of the triangle, it is possible to identify that this block is upward.

FIG. 55 shows the state that the blocks shown in FIG. 54 are connected two-by-two in the horizontal and vertical directions.

Figure 56:
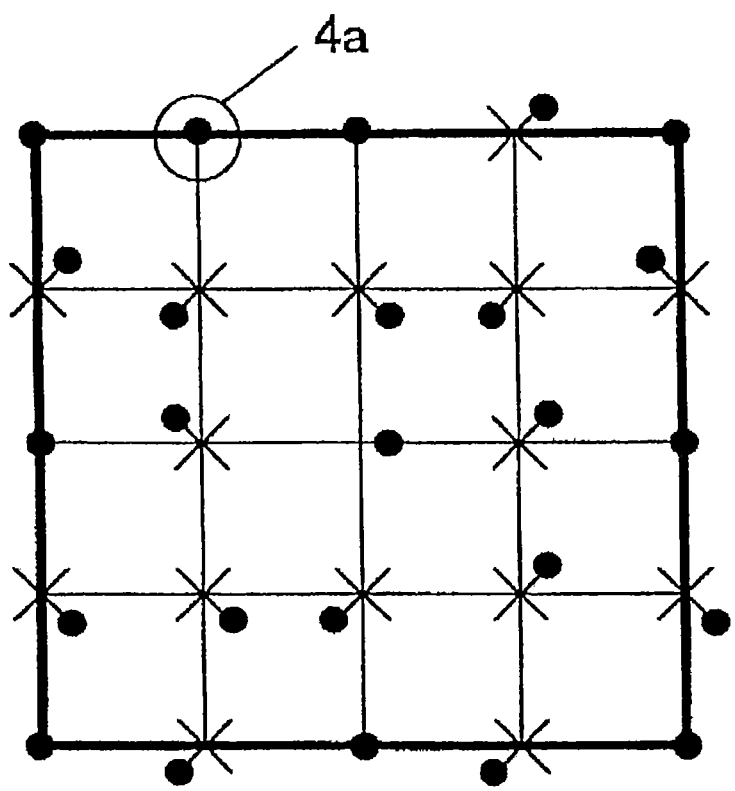
FIG. 56 is an explanatory view defining a direction of a block by conforming partial reference points to the grid points in the block having reference points arranged at four corners of the block.

FIG. 56 shows the case that a reference point 4a is conformed to a grid point. In the case of arranging the reference points 4a so as not to be symmetric about a point with reference to the center of the block, it is possible to define the direction of the block as it is without arranging the direction area and the direction dot.

FIG. 57 shows the state that the sizes of the dots at the reference points 48a to 48e of the dot pattern shown in FIG. 48 are larger than the information dot 3.

Further, according to the present embodiment, each of the information dot, the direction dot, and the reference dot having a circular form is described, however, the present embodiment is not limited to this and it is obvious that a noncircular form such as a triangle, a square, and other polygons may be available.

Figure 58:
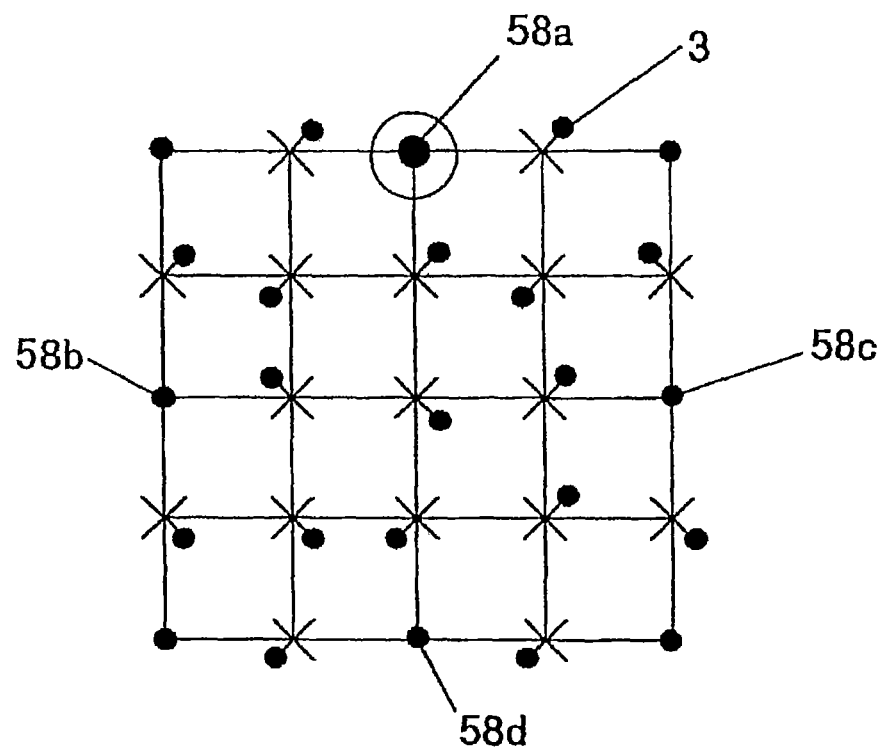
FIG. 58 is an explanatory view changing a size of a reference point and defining a direction of a block in a block having a shape thereof as the grid.

In FIG. 58, by making only a reference dot 58a at one position larger than the other reference dots 58b to 58d, the direction of the block is defined by the direction in which this large reference dot 58a is arranged. Also with respect to this reference dot 58a, it is obvious that the shape and the size may be changed. In addition, without arrangement of the reference dot 58*a*, the direction of the block may be defined. Further, in the case of defining the direction of the block by arranging such a dot having its size changed, this dot is not always to be a reference dot but it may be the information dot 3. In the case of defining the direction of the block by changing the size of the information dot 3, without sacrificing the information of the information dot 3, the direction of the block can be defined.

Figure 59:
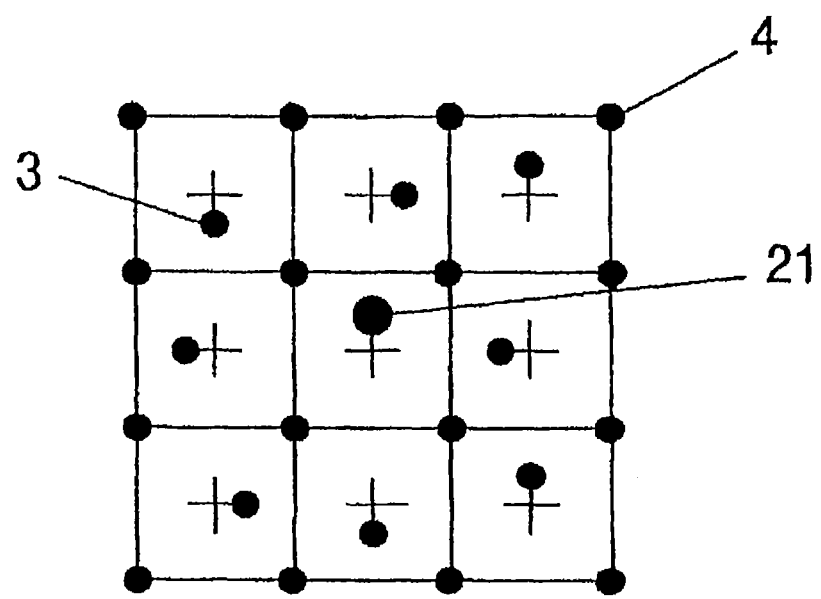
FIG. 59 is an explanatory view showing the state that the size of the information dot arranged at the center of the block is made larger than other information dots to be made into a direction dot.

In FIG. 59, by making the size of the direction dot 21 larger than the size of the other information dot 3 or the size of the reference grid point dot 4, it is possible to identify this dot to be the direction dot 21. Thus, by changing the size of the direction dot 21 into the size of the other information dot, even if the directional standard of the information dot 3 is the same as that of the direction dot 21 (in FIG. 59, both of them are the horizontal and vertical directions) it is possible to define the direction of the block.

Figure 62:
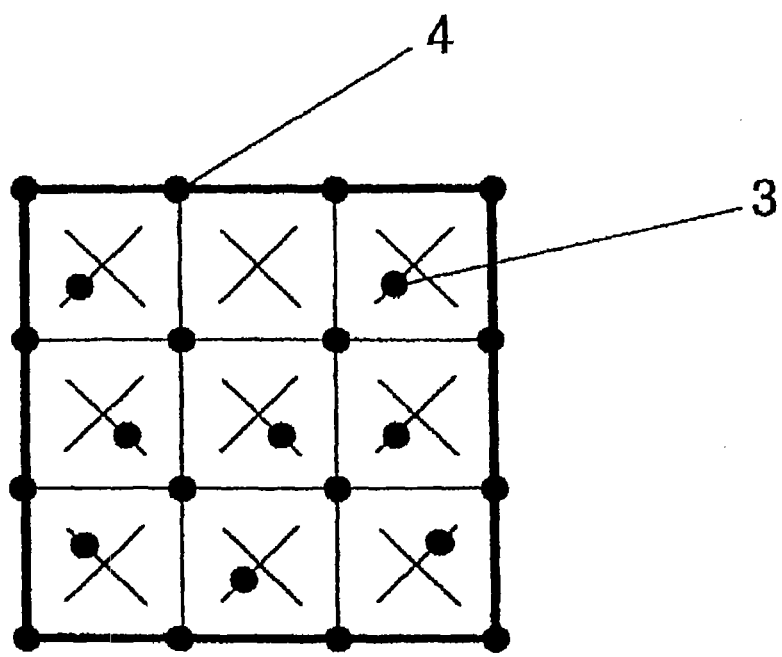
FIG. 62 is an explanatory view defining the direction of the block by arranging no information dot on a virtual grid point of a grid area on a center of a block.

FIG. 62 shows the structure that the information dot is not arranged in the grid area at the upper center of the block. Thus, without arrangement of the information dot 3 at a predetermined grid area (the virtual grid point or the reference point), it is possible to define the direction of the block depending on the position of that grid area. In this drawing, it is known that this block is upward.

Figure 63:
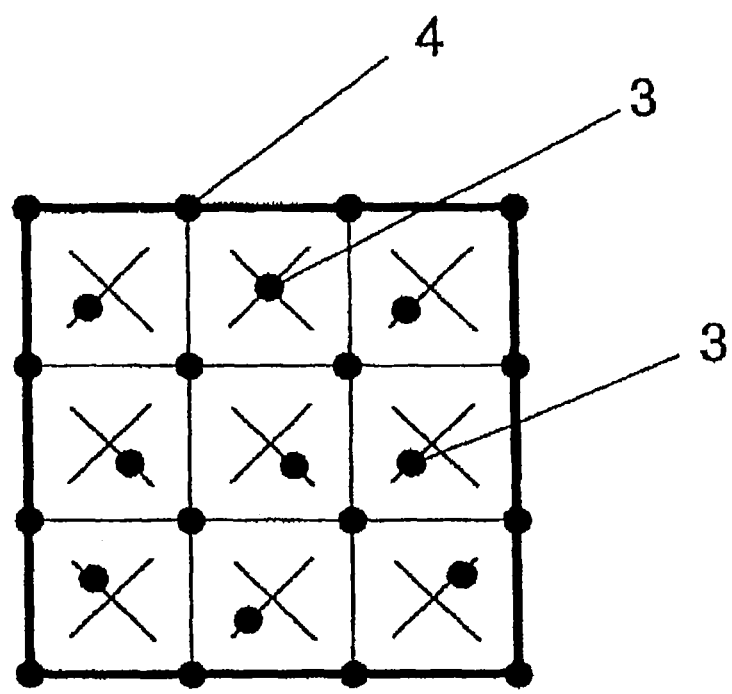
FIG. 63 is an explanatory view defining the direction of the block by arranging an information dot on the virtual grid point of the grid area on the center of the block.

In addition, FIG. 63 shows the case that the direction of the block is defined by arranging the information dot 3 on the virtual grid point at the upper center of the block.

Figure 60:
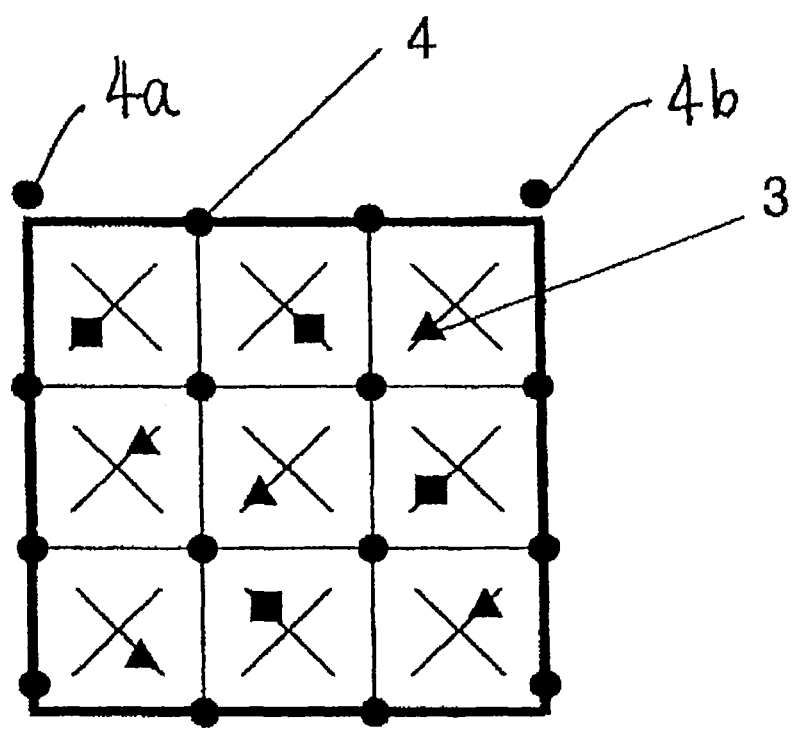
FIG. 60 is an explanatory view changing a shape of an information dot and defining a direction of a block.

FIG. 60 represents the shape of the information dot to be arranged in the grid area by a plurality of shapes. As shown in FIG. 60, the shape of the information dot is selected from among a black square, a black triangle, and a black circle, and the different information may be defined for each shape.

In addition, in this drawing, the direction of the block can be defined by arranging two dots among the reference grid point dots at the four corners deviated from the reference grid point. In this drawing, since the reference grid point dots at the upper left and the upper right of the block are deviated upward, it is possible to recognize that this block is upward.

Figure 61:
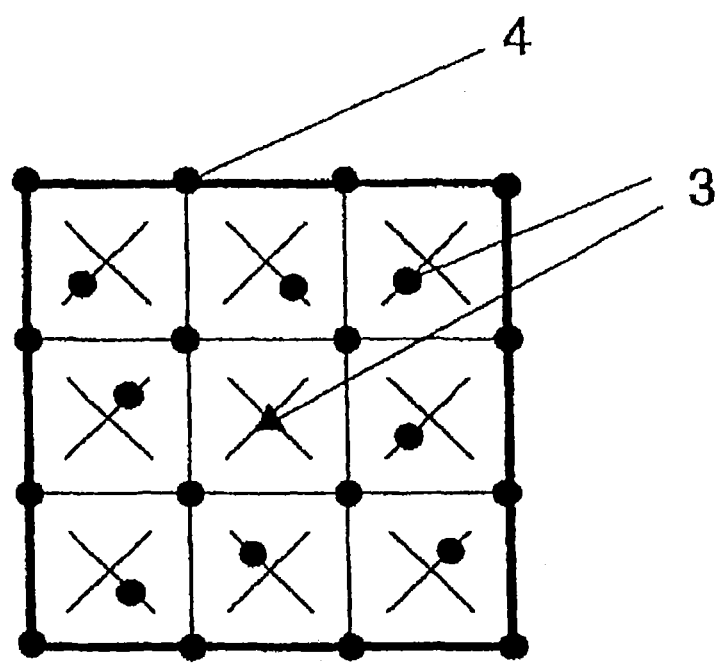
FIG. 61 is an explanatory view defining the direction of the block by changing the shape of the information dot arranged at the center of the block with the shape of the other information dot.

FIG. 61 shows the state that only the information dot 3 arranged at the virtual grid point of the grid area at the center of the block is different from the other information dot in shape. At this virtual grid point, a triangle information dot is arranged, and due to the shape of this triangle, it is possible to recognize that this block is upward.

The present invention can be widely applied to an illustrated book, a photograph, a card game, and a security system or the like being read by an optical sensor.

What is claimed is:

1. A dot pattern comprising: in a block of a predetermined area,
    a plurality of reference dots;
    a plurality of virtual reference points; and
    one or more information dots that has a second predetermined positional relationship for each of the plurality of virtual reference points that have a first positional relationship with the plurality of reference dots.

2. The dot pattern according to claim 1,
    wherein at least one information dot at a predetermined position among the information dots shows a direction of the block by a direction from one of the virtual reference points.

3. The dot pattern according to claim 1,
    wherein the reference dots are arranged at grid shape in the block area; and
    using centers of areas surrounded by four of the reference dots as the virtual reference points,
    the information dot at a predetermined position is arranged in a directional standard different from directional standards where other information dots are arranged.

4. The dot pattern according to claim 1,
    wherein, the reference dots are arranged on virtual reference grid points that are provided at certain intervals on reference grid lines provided in a longitudinal direction and a lateral direction in the area of the block;
    intersecting points of grid lines that connect the virtual reference grid points and are parallel to the reference grid lines, are defined as the virtual reference points; and
    the information dot at a predetermined position is arranged in a directional standard different from directional standards where other information dots are arranged.

5. The dot pattern according to claim 4,
    wherein, in the block, the information dots arranged at positions where a position or an area to which the information dot at a predetermined position belongs is rotated by 90 degrees around the center of the block, are arranged in directional standards different from a directional standard where the information dot at a predetermined position is arranged.

6. The dot pattern according to claim 1,
    wherein, the reference dots are arranged on virtual grid points provided on the reference grid lines in a longitudinal direction, among the virtual grid points provided at certain intervals on the reference grid lines in lateral and longitudinal directions provided in the area of the block, by defining, as the virtual reference points, the intersecting points of grid lines that are formed by lines connecting the reference grid point dots and lines connecting the virtual grid points in the longitudinal direction; and
    the information dot at a predetermined position is arranged in a directional standard different from directional standards where other information dots are arranged.

7. The dot pattern according to claim 6,
    wherein in the block, the information dots, other than the information dot at a predetermined position, located on one of the grid lines in the lateral direction on which the information dot at a predetermined position is arranged, and at least one of the information dots which is located at a symmetric position with the information dot at a predetermined position having one of the grid lines in a lateral center direction of the block as a symmetric axis, are arranged in directional standards different from a directional standard where the information dot at a predetermined position is arranged.

8. The dot pattern according to claim 1,
    wherein the reference dots are arranged on virtual reference grid points that are provided at certain intervals on reference grid lines provided in a longitudinal direction and a lateral direction in the area of the block;
    by straight lines provided from each of the reference dots arranged on the reference grid lines in lateral and longitudinal directions defining as grid lines, being parallel to the reference grid lines in other direction, intersecting points of the grid lines are defined as the virtual reference points; and
    the information dot at a predetermined position is arranged in a directional standard different from directional standards where other information dots are arranged.

9. The dot pattern according to claim 2,
    wherein the information dot at a predetermined position is made into a direction dot showing a direction of the block.

10. The dot pattern according to claim 1,
wherein the direction of the block is defined by the arrangement of the reference dots or the virtual reference points.

11. The dot pattern according to claim 1,
wherein the direction of the block is defined by differentiating directional standards of the information dots at, at least, one or more predetermined positions from those of the other information dots.

12. The dot pattern according to claim 11,
wherein, in the information dots at the one or more predetermined positions having the different directional standards from those of the other information dots, the direction of the block is defined by the directions of the information dots from the virtual reference points.

13. The dot pattern according to claim 11,
wherein the predetermined positions are three or more; and the direction of the block is defined by the shape connecting respective positions by a line.

14. The dot pattern according to claim 11,
wherein the predetermined positions are one; and the direction of the block is defined by the arrangement position thereof in the block.

15. The dot pattern according to claim 1,
wherein the direction of the block is defined by differentiating the size or the shape of the reference dots or the information dots from those of the other dots.

16. The dot pattern according to claim 1,
wherein the direction of the block is defined depending on whether or not the information dots are located on the virtual reference points.

17. The dot pattern according to claim 1,
wherein the information is defined by a size or a shape of the information dots.

18. The dot pattern according to claim 1,
wherein the direction of the block is defined by the shape of the information dots.

19. The dot pattern according to claim 1,
wherein the reference dots coincide with the virtual reference points.

20. The dot pattern according to claim 1,
wherein the information dots define information by at least one of a distance and a direction from each of the virtual reference points.

21. The dot pattern according to claim 1, wherein
the information dots represent information by whether or not the information dots are arranged with reference to the virtual reference points.

22. The dot pattern according to claim 1, wherein the information dots include:
first information dots, of which information are defined by at least one of a distance and a direction from each of the virtual reference points; and
second information dots that define information based on whether or not the second information dots are arranged on the virtual reference points; and
the first information dots and the second information dots are mixed within the block.

23. The dot pattern according to claim 1, wherein
the information dots define information, with reference to respective virtual reference points, by at least one of a distance and a direction from the virtual reference points as well as whether the information dots are arranged on the virtual reference points.

24. A medium formed with a dot pattern, the dot pattern comprising: in a block of a predetermined area, a plurality of reference dots, a plurality of virtual reference points, and one or more information dots that has a second predetermined positional relationship for each of the plurality of virtual reference points that have a first positional relationship with the plurality of reference dots.

25. An optical reading device, comprising:
a camera that images a dot pattern, the dot pattern comprising: in a block of a predetermined area, a plurality of reference dots, a plurality of virtual reference points, and one or more information dots that has a second predetermined positional relationship for each of the plurality of virtual reference points that have a first positional relationship with the plurality of reference dots; and
an analysis unit that analyzes the dot pattern and retrieves numerical values defined by the dot pattern.

26. A reading method, comprising:
imaging a dot pattern, the dot pattern comprising: in a block of a predetermined area, a plurality of reference dots, a plurality of virtual reference points, and one or more information dots that has a second predetermined positional relationship for each of the plurality of virtual reference points that have a first positional relationship with the plurality of reference dots;
analyzing the dot pattern; and
retrieving numerical values defined by the dot pattern.

27. An electronic device comprising a storage medium storing:
a program for analyzing image data of a dot pattern imaged by a camera and retrieving numerical values defined by the dot pattern,
the dot pattern comprising: in a block of a predetermined area, a plurality of reference dots, a plurality of virtual reference points, and one or more information dots that has a second predetermined positional relationship for each of the plurality of virtual reference points that have a first positional relationship with the plurality of reference dots.

28. A dot pattern reading device, comprising:
a camera for imaging a dot pattern, the dot pattern comprising: in a block of a predetermined area, a plurality of reference dots, a plurality of virtual reference points, and one or more information dots that has a second predetermined positional relationship for each of the plurality of virtual reference points that have a first positional relationship with the plurality of reference dots;
an analysis unit for analyzing the dot pattern and retrieving numerical values defined by the dot pattern; and
an information output device for outputting information corresponding to the retrieved numerical values.

29. A reading method comprising:
imaging a dot pattern, the dot pattern comprising: in a block of a predetermined area, a plurality of reference dots, a plurality of virtual reference points, and one or more information dots that has a second predetermined positional relationship for each of the plurality of virtual reference points that have a first positional relationship with the plurality of reference dots;
analyzing the dot pattern and retrieving numerical values defined by the dot pattern; and
outputting information corresponding to the retrieved numerical values.

30. An information processing system comprising:
a dot pattern reading device comprising:
a camera for imaging a dot pattern, the dot pattern comprising: in a block of a predetermined area, a plurality of reference dots, a plurality of virtual reference points, and one or more information dots that has a second predetermined positional relationship for each of the plurality of virtual reference points that have a first positional relationship with the plurality of reference dots;
an analysis unit for analyzing the dot pattern and retrieving numerical values defined by the dot pattern; and
a transmission unit for transmitting the numerical values to an information processing device;
a receiving unit for receiving the numerical values; and
a processing unit for outputting information and/or executing a program corresponding to the numerical values.

31. An information processing device comprising:
a camera for imaging a dot pattern, the dot pattern comprising: in a block of a predetermined area, a plurality of reference dots, a plurality of virtual reference points, and one or more information dots that has a second predetermined positional relationship for each of the plurality of virtual reference points that have a first positional relationship with the plurality of reference dots; and
an analysis unit for analyzing the dot pattern, retrieving numerical values defined by the dot pattern, and executing a processing corresponding to the retrieved numerical values.

32. The information processing device according to claim 31, wherein
the corresponding processing is outputting at least one of a voice, an image, a moving image, a character, and an executed result of a program.

33. An electronic device storing:
a dot pattern generation program for generating a dot pattern, the dot pattern comprising: in a block of a predetermined area, a plurality of reference dots, a plurality of virtual reference points, and one or more information dots that has a second predetermined positional relationship for each of the plurality of virtual reference points that have a first positional relationship with the plurality of reference dots.

34. A dot pattern generation device programmed according to a dot pattern generation algorithm for generating a dot pattern, the dot pattern comprising: in a block of a predetermined area, a plurality of reference dots, a plurality of virtual reference points, and one or more information dots that has a second predetermined positional relationship for each of the plurality of virtual reference points that have a first positional relationship with the plurality of reference dots.

35. A dot pattern generation method for generating a dot pattern according to a dot pattern generation algorithm for generating a dot pattern, the dot pattern comprising: in a block of a predetermined area, a plurality of reference dots, a plurality of virtual reference points, and one or more information dots that has a second predetermined positional relationship for each of the plurality of virtual reference points that have a first positional relationship with the plurality of reference dots.

36. A voice output device comprising:
a camera for imaging a dot pattern, the dot pattern comprising: in a block of a predetermined area, a plurality of reference dots, a plurality of virtual reference points, and one or more information dots that has a second predetermined positional relationship for each of the plurality of virtual reference points that have a first positional relationship with the plurality of reference dots;
an analysis unit for analyzing the dot pattern and retrieving numerical values defined by the dot pattern; and
a voice output unit for outputting a voice associated with the numerical values retrieved by the analysis unit.

37. An information input and output device comprising:
a camera for imaging a dot pattern, the dot pattern comprising: in a block of a predetermined area, a plurality of reference dots, a plurality of virtual reference points, and one or more information dots that has a second predetermined positional relationship for each of the plurality of virtual reference points that have a first positional relationship with the plurality of reference dots;
an analysis unit for analyzing the dot pattern and retrieving numerical values defined by the dot pattern; and
a unit for performing at least one of outputting information associated with the numerical values retrieved by the analysis unit and executing a program related therewith.

\* \* \* \* \*